(12) United States Patent
Moeini et al.

(10) Patent No.: US 11,914,856 B2
(45) Date of Patent: Feb. 27, 2024

(54) WIRELESS POSITIONING SYSTEMS

(71) Applicants: Peyman Moeini, Richmond Hill (CA); Akbar Ahmari, Richmond Hill (CA); Furat Al-Obaidy, Richmond Hill (CA); Arghavan Asad, Richmond Hill (CA); Dishan Fernando, Richmond Hill (CA); Xavier Navajothy Fernando, Richmond Hill (CA); Sammy Guergachi, Richmond Hill (CA); Muhammad Jaseemuddin, Richmond Hill (CA); Xiaofeng Li, Richmond Hill (CA); Ryan Murari, Richmond Hill (CA); Farah Mohammadi, Richmond Hill (CA)

(72) Inventors: Peyman Moeini, Richmond Hill (CA); Akbar Ahmari, Richmond Hill (CA); Furat Al-Obaidy, Richmond Hill (CA); Arghavan Asad, Richmond Hill (CA); Dishan Fernando, Richmond Hill (CA); Xavier Navajothy Fernando, Richmond Hill (CA); Sammy Guergachi, Richmond Hill (CA); Muhammad Jaseemuddin, Richmond Hill (CA); Xiaofeng Li, Richmond Hill (CA); Ryan Murari, Richmond Hill (CA); Farah Mohammadi, Richmond Hill (CA)

(73) Assignee: Peytec Inc., Richmond Hill (CA)

( * ) Notice: Subject to any disclaimer, the term of this patent is extended or adjusted under 35 U.S.C. 154(b) by 0 days.

(21) Appl. No.: 17/144,857

(22) Filed: Jan. 8, 2021

(65) Prior Publication Data

US 2021/0132761 A1 May 6, 2021

Related U.S. Application Data

(63) Continuation-in-part of application No. 16/298,819, filed on Mar. 11, 2019, now abandoned.
(Continued)

(51) Int. Cl.
*G06F 3/0485* (2022.01)
*G06F 3/04845* (2022.01)

(52) U.S. Cl.
CPC ........ *G06F 3/0485* (2013.01); *G06F 3/04845* (2013.01); *G06F 2203/04803* (2013.01)

(58) Field of Classification Search
CPC .......... G06F 16/21; H04W 4/33; H04L 41/04
See application file for complete search history.

(56) References Cited

U.S. PATENT DOCUMENTS

| 2005/0078006 A1* | 4/2005 | Hutchins | G08B 13/2454 340/561 |
| 2005/0280535 A1* | 12/2005 | Gary, Jr. | G08B 21/22 340/572.1 |
| 2011/0211563 A1* | 9/2011 | Herrala | H04W 4/029 370/338 |

\* cited by examiner

*Primary Examiner* — Kiet M Doan
(74) *Attorney, Agent, or Firm* — Head, Johnson, Kachigian & Wilkinson, PC

(57) ABSTRACT

A method for dynamically spatially visualizing in real time or historically tag localization and sensing data in a User Interface through the combined GUI elements of a Floor Layout view. An indoor map view visually indicates tags as colored dots moving within boundaries of Readers. Localization data from these tags are used to position and move them in a spatially accurate way. Playback controls GUI which allows for pausing or to instantly view historical tag localization and sensing data by dragging the playback control's scrubber backwards in time.

18 Claims, 21 Drawing Sheets

Related U.S. Application Data

(60) Provisional application No. 62/958,475, filed on Jan. 8, 2020, provisional application No. 62/962,669, filed on Jan. 17, 2020, provisional application No. 62/971,732, filed on Feb. 7, 2020, provisional application No. 62/640,645, filed on Mar. 9, 2018, provisional application No. 62/640,646, filed on Mar. 9, 2018, provisional application No. 62/640,649, filed on Mar. 9, 2018, provisional application No. 62/640,651, filed on Mar. 9, 2018.

WIRELESS POSITIONING SYSTEMS

CROSS-REFERENCE TO RELATED APPLICATION

This application claims the benefit of:
U.S. Provisional Patent Application Ser. No. 62/971,732, filed Feb. 7, 2020; and
U.S. Provisional Patent Application Ser. No. 62/962,669, filed Jan. 17, 2020; and
U.S. Provisional Patent Application Ser. No. 62/958,475, filed Jan. 8, 2020,
and is a continuation in part of U.S. patent application Ser. No. 16/298,819, filed Mar. 11, 2019, which claimed the benefit of
U.S. Provisional Patent Application Ser. No. 62/640,645, filed Mar. 9, 2018;
U.S. Provisional Patent Application Ser. No. 62/640,646, filed Mar. 9, 2018;
U.S. Provisional Patent Application Ser. No. 62/640,649, filed Mar. 9, 2018; and
U.S. Provisional Patent Application Ser. No. 62/640,651, filed Mar. 9, 2018.

BACKGROUND OF THE INVENTION

1. Field of the Invention

The invention relates to the field of wireless positioning systems.

2. Prior Art

There exists great interest in the use of wireless technology to provide for remote monitoring and control. Small, battery-powered transceivers, called tags, are commonly applied ("tagged") to machines, pallets, etc., to provide for localization of the tagged item through communication with readers. Known systems have relatively undesirable combinations of cost, durability, portability, battery-life and accuracy.

SUMMARY OF THE INVENTION

It's one object of the present invention to provide a graphical user interface (GUI) geared specifically towards providing a visual map of an indoor floor.

It's another object of the present invention to provide such a GUI that allows for a very elegant way to visualize in real time or historically via playback the localization and sensory data acquired from tags.

It's yet another object of the present invention to provide a GUI that allows the creation of automated workflows.

Lastly, it's an object of the present invention to present an overarching GUI that allows for a cohesive way to navigate to these presented GUIs.

BRIEF DESCRIPTION OF THE DRAWINGS

FIG. 2 is the Floor Layout screen that appears once signed in.

DETAILED DESCRIPTION OF THE PREFERRED EMBODIMENTS

Figure 1:
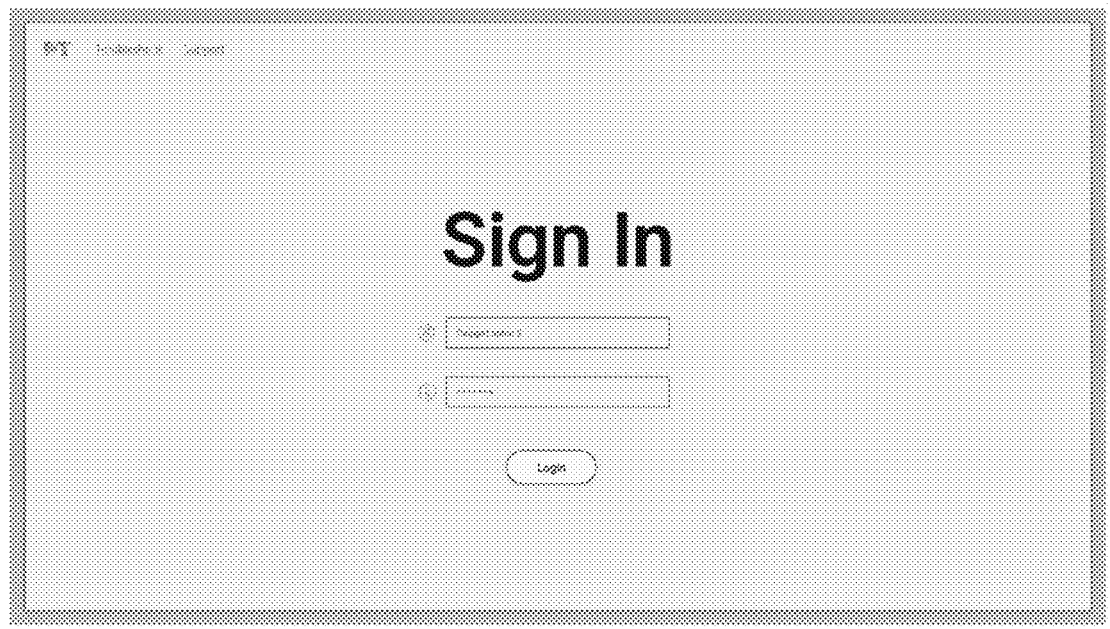
FIG. 1 is the Sign In screen.

To access SIMS, we require users to login with an account (FIG. 1). The accounts are created and managed by the end user. A user can be either a regular user, with some features hidden and access set to read-only, or an admin user, with access to all features without editing restrictions.

Figure 2:
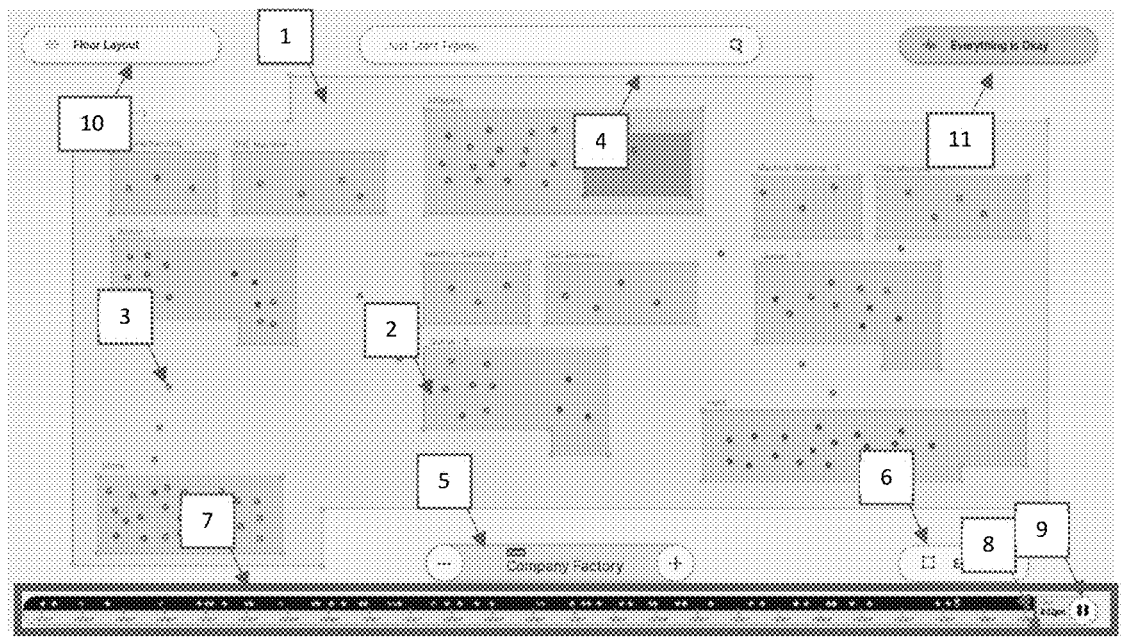
Figure 3:
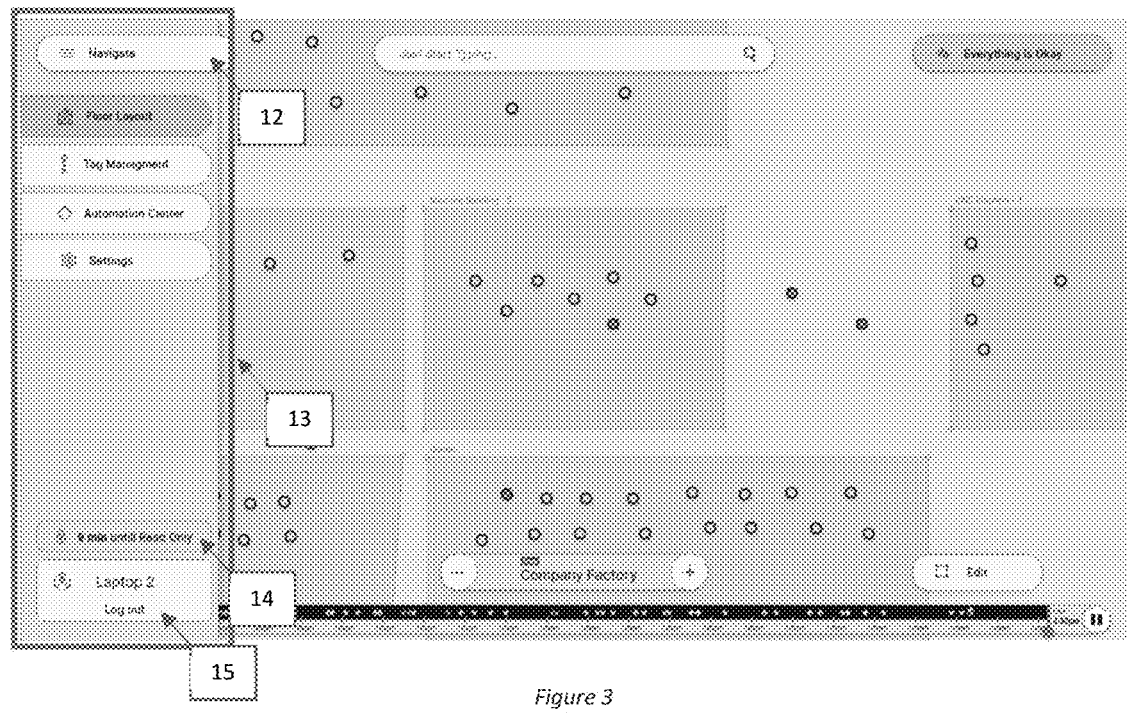
FIG. 3 shows the Navigation Panel accessible from every screen, in this case from Floor Layout screen.
Figure 4:
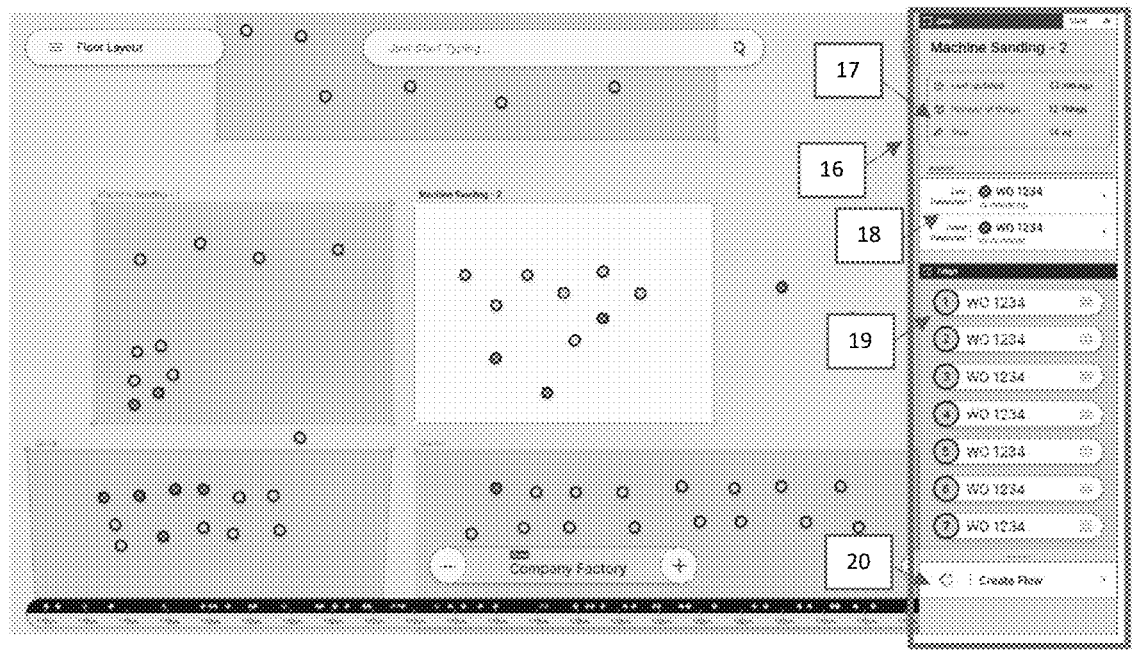
FIG. 4 shows the Zone Panel which appears once a Zone is selected in the Floor Layout screen.
Figure 5:
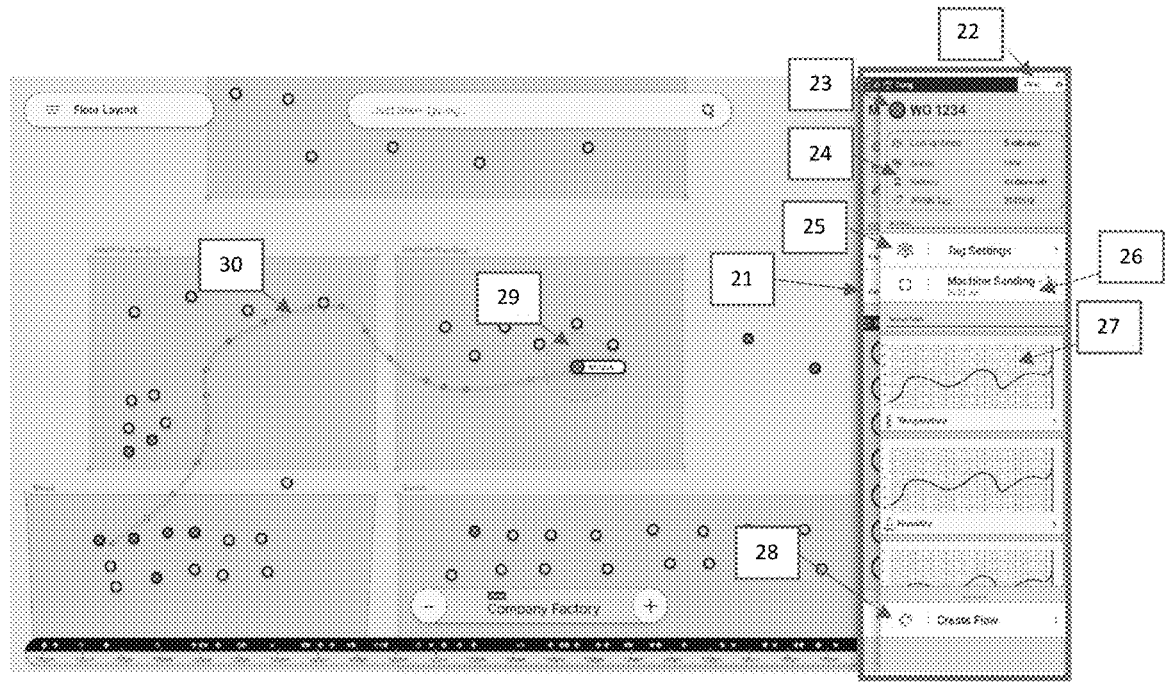
FIG. 5 shows the Thing Panel which appears once selecting a Thing in Floor Layout, as well as how Panels can slide on top of one another, in this case the Thing Panel on top of the Zone Panel.
Figure 6:
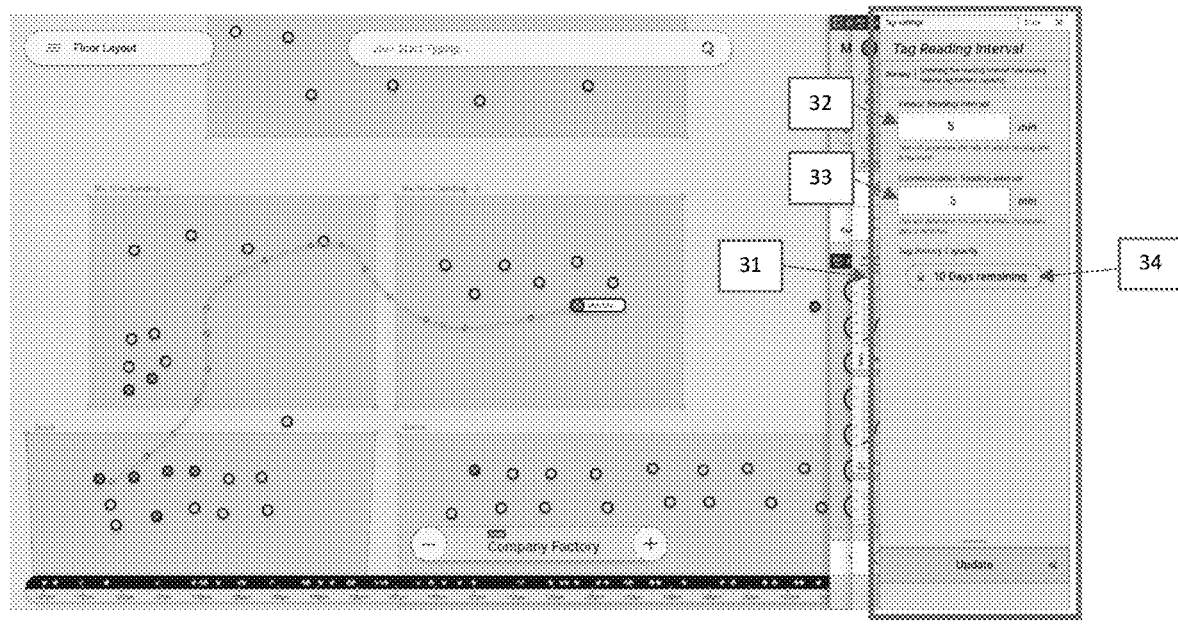
FIG. 6 shows the Tag Settings Panel.
Figure 7:
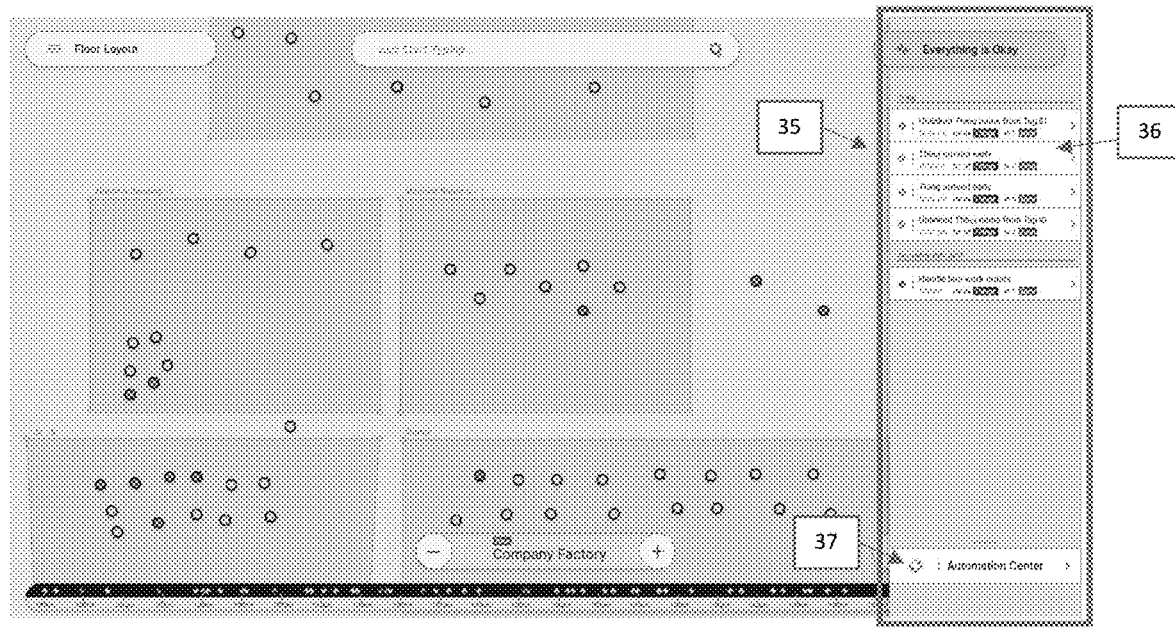
FIG. 7 shows the Activity Panel accessible from any screen, in this case from the Floor Layout screen.

After login in we show the user a full view of the floor layout contained in the parent zone (FIG. 2). The parent zone (1) is the zone that contains all child zones (2) on a specific floor. We depict tags in the form of colored dots (3) which move in real time in and around child zones. Users can search for zones and tags via a search bar (4). The current zone in focus is determined by how far zoomed in our out the user is into the floor layout, this is displayed in the zoom control bar (5). To edit zones users must press the edit button (6). To go back in history users can use the playback control bar (7) and drag the scrubber (8) back in time. The colored diamonds in playback control bar represent historical activity. the Users can also pause real-time update of tags localization using the pause button (9). To navigate to other screens users must press the navigation button (10). To view the activity panel users must press the status button (11).

When users click the navigation button (12) the navigation panel will slide into view (13). Users without admin accounts can access restricted features and make edits for a limited time by entering a password in the navigation panel, the time after entering the password until the restrictions are put back in place is displayed (14). Users can log out by clicking the logout button (15).

When users select a zone the Zone Panel slides into view (16). The zone panel shows metadata about the zone (17). It allows users to view the last and oldest transaction through the zone (18).

Transactions happen when a tag enters or leaves a zone. The Zone Panel contains all a list of Things ordered chronologically or by user (19). Things represent the tagged objects being tracked on the Floor Layout which can be named by users. Users can create Flows from the Zone Panel (20).

When selecting a Thing the Thing Panel slides into view (21). If a Panel is already in view, a new Panel will slide on top of the previous panel. Users can view the previous Panel by dismissing the current panel (22) or by selecting the previous Panel. The Thing Panel indicates the state of the Thing based on color (23). The Thing Panel contains metadata about the selected Thing (24). It contains the ability to edit settings for the Thing's Tag (25). It contains the ability to select the Zone the Thing is within (26). It contains graphs representing sense data tracked by the Things tag (27). It contains the ability to create a Flow with the selected Thing as the scope (28). The selected thing in the Floor Layout expands to show the name of the Thing along with a dynamic uncertainty radius depicting the area where the tag is located based on the Reader's ability to localize the tag (29). The selected Thing also shows its historical positions via a path leading up to the Thing with dots along the path representing when localization data on the tag was received (30).

After clicking the Tag Settings button in the Tag Panel, the Tag Settings Panel slides out (31). In the Tag Settings Panel users can edit the sensor reading interval and the communication reading interval (32,33). Changing these reading intervals affects the time to drain the tag's battery (34).

When the user clicks on the Status button the Activity Panel slides out (35).

The Activity Panel contains chronologically ordered Activity generated by Flows (36). Activity represents a log of a triggered Flow, showing the Flow's name, the Flow's scope, the Flow's triggering timestamp, and the Flow's effect. Selecting an Activity will show the associated Flow's Panel. Users can access the Automation Center from the Activity Panel (37).

Figure 8:
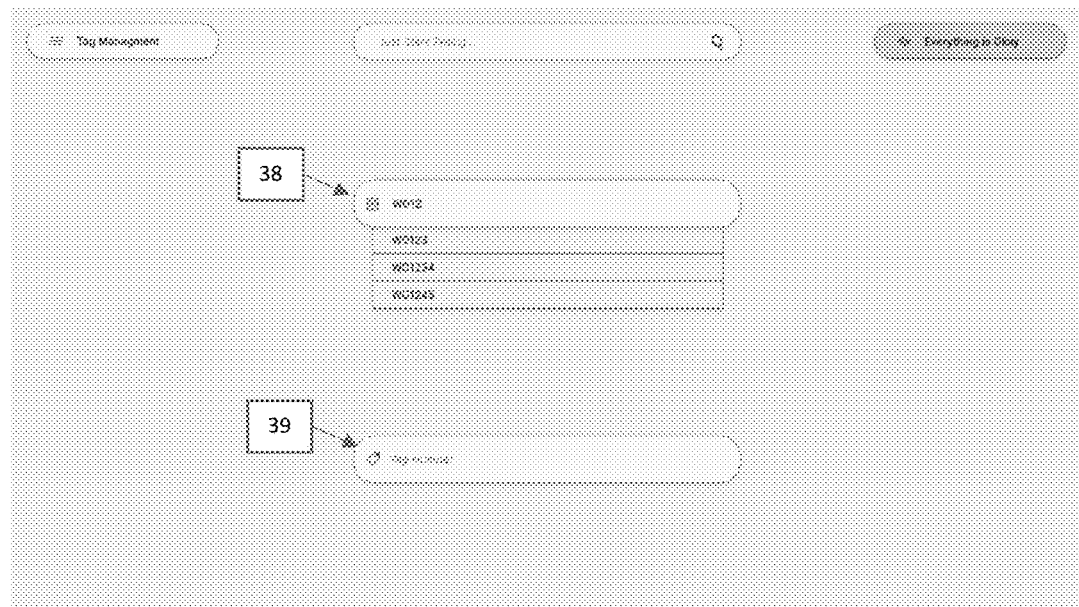
FIG. 8: shows the Tag Management Screen with the name field being filled out.
Figure 9:
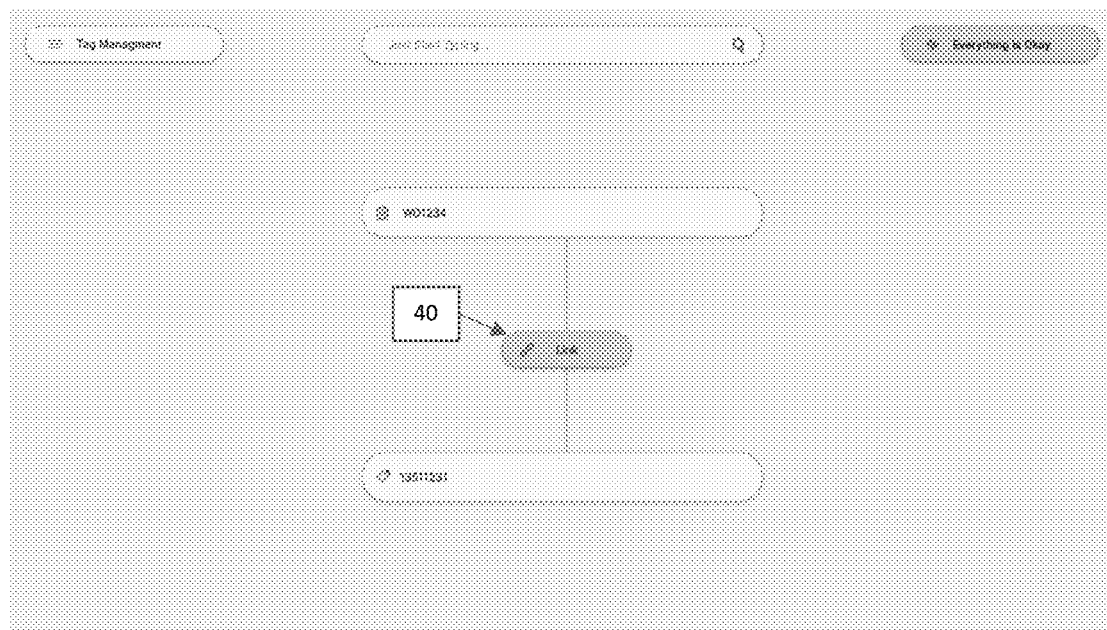
FIG. 9 shows the Tag Management Screen with the Thing name and Tag ID fields filled out and the Link button appearing.

In the Tag Management screen (FIG. 8), users scan name their Things by typing in the name they want to assign it at the top (38). And the Tag ID found on the physical Tag at the bottom (39).

When the Thing's name and the Tag ID is inputted by the user, they can link both by clicking the link button (40). Linking a name to a Tag ID will change the Thing's name from previously being the Tag ID to the inputted name.

Figure 10:
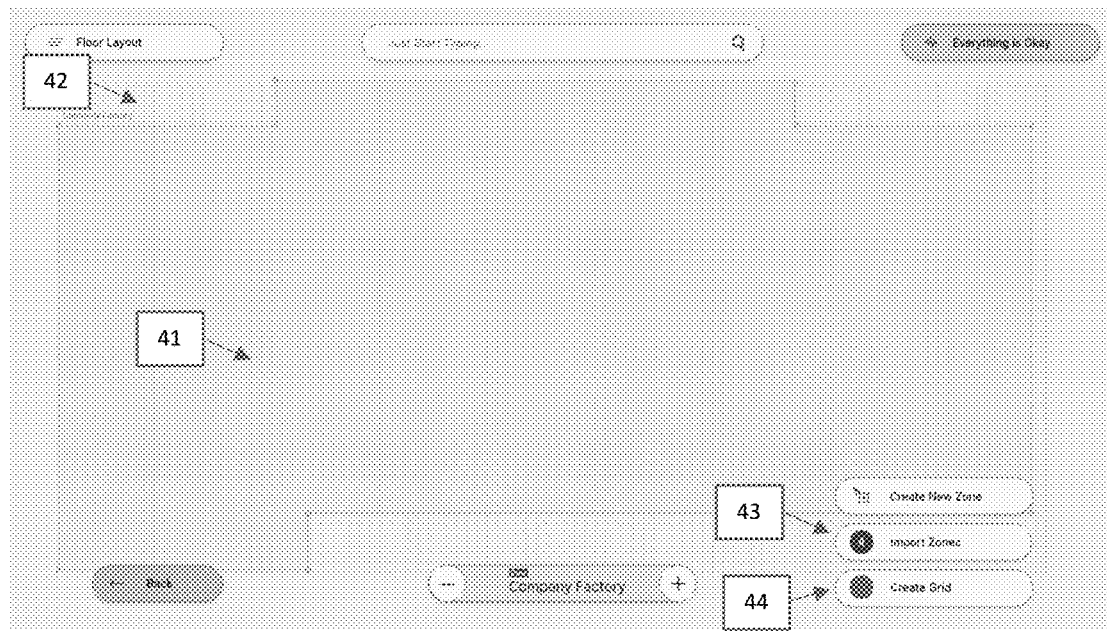
FIG. 10 shows the Zone Editor.
Figure 11:
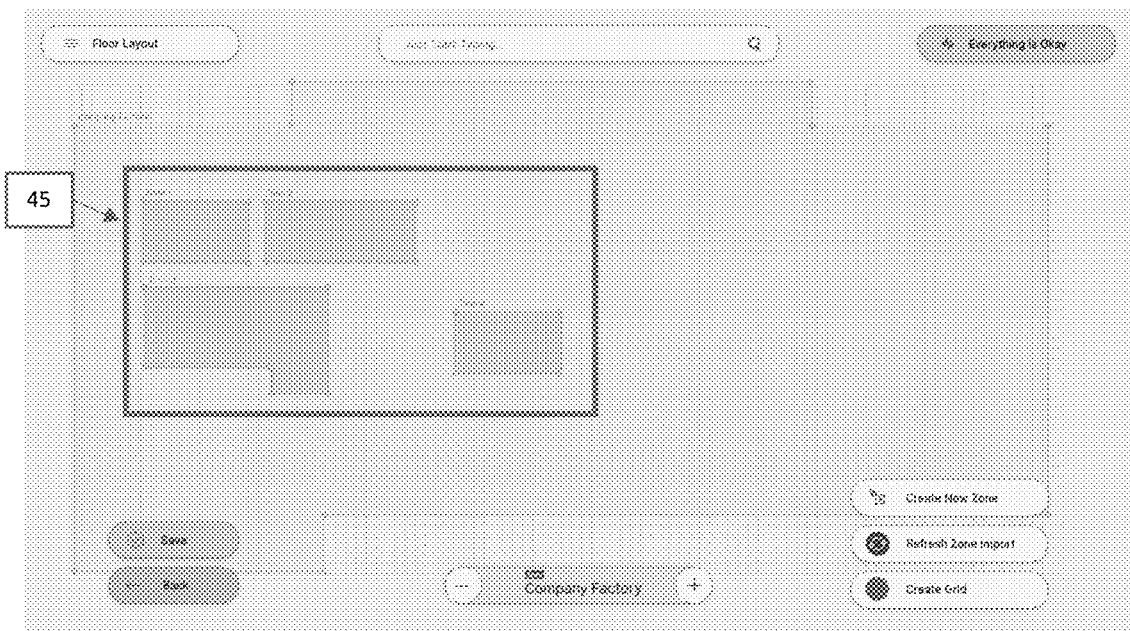
FIG. 11 shows the result of importing Zones into the Zone Editor.

When users select the Edit button in Floor Layout (FIG. 2) they are taken to the Zone Editor which should have a Parent Zone (41). The Zone Editor depicts the extent of the Readers through the light gridded area in the background (42). This gridded area is therefore the boundary within which users can draw Zones. Zones are user defined areas on a floor monitored by Readers. Users can collect Zones using a hand-held Clicker Tag which would save Zone positions to be imported using the Import Zones button in the Zone Editor (43). Users can define a grid inside their Parent Zone by selecting the Create Grid button (44). When users click the Import Zones button (FIG. 10) the collected Zones populate the Parent Zone (45).

Users can drag a Zone by first clicking on it, then dragging it (46). Zones can not overlap one another. Users can Delete or Rename using the Delete Zone and Rename button after selecting a Zone (47,48).

Figure 13:
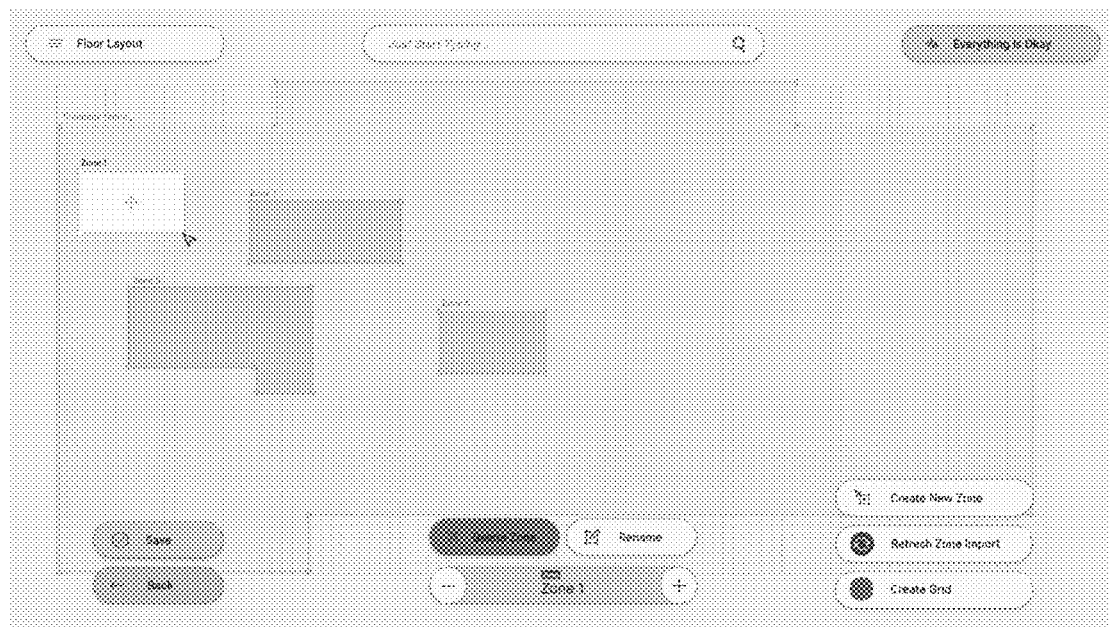
FIG. 13 shows a cursor selecting the vertex of a selected Zones in the Zone Editor.
Figure 14:
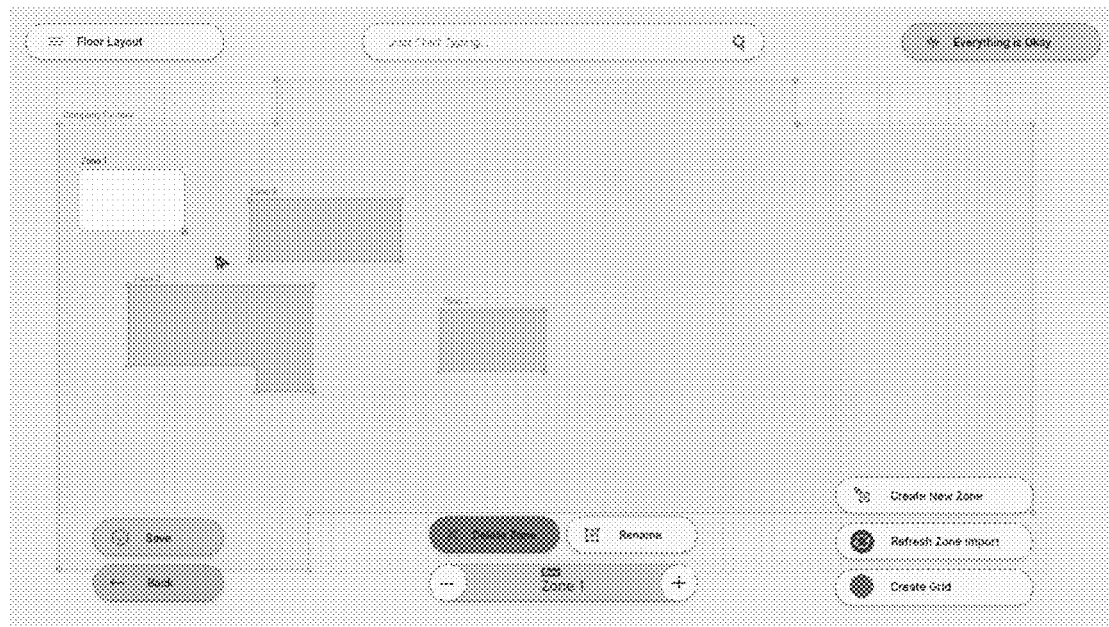
FIG. 14 shows a cursor Resizing Zone by dragging Vertex in Zone Editor.
Figure 15:
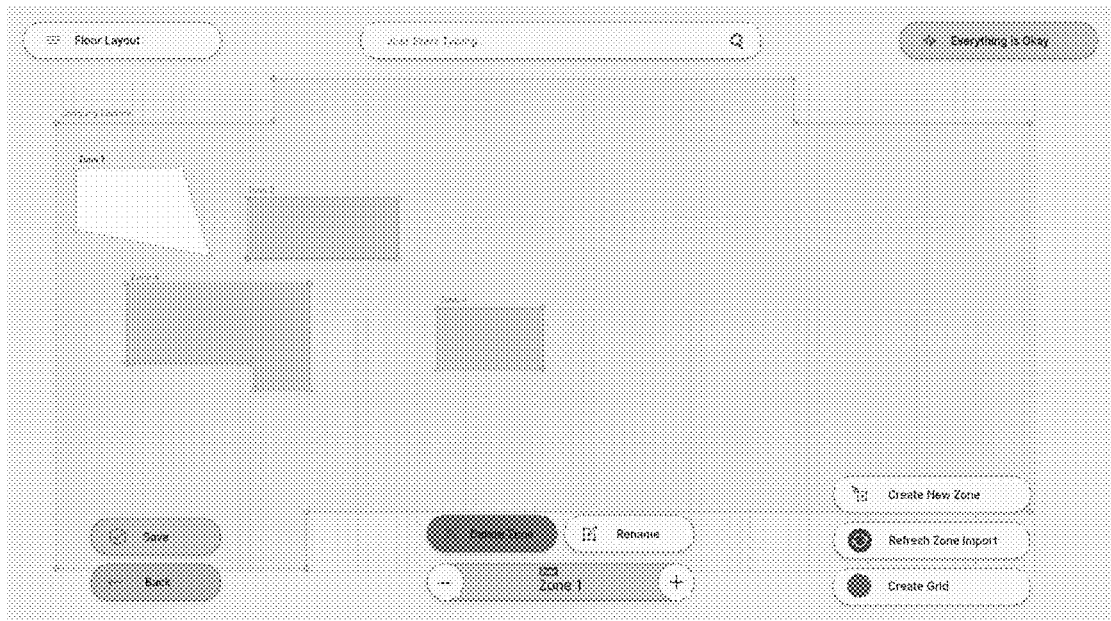
FIG. 15 shows the resized Zone in the Zone Editor.

Users can resize a Zone by selecting a vertex of a selected Zone (FIG. 13) then dragging the vertex to a desired location (FIG. 14). The result is a transformed Zone (FIG. 15).

Figure 12:
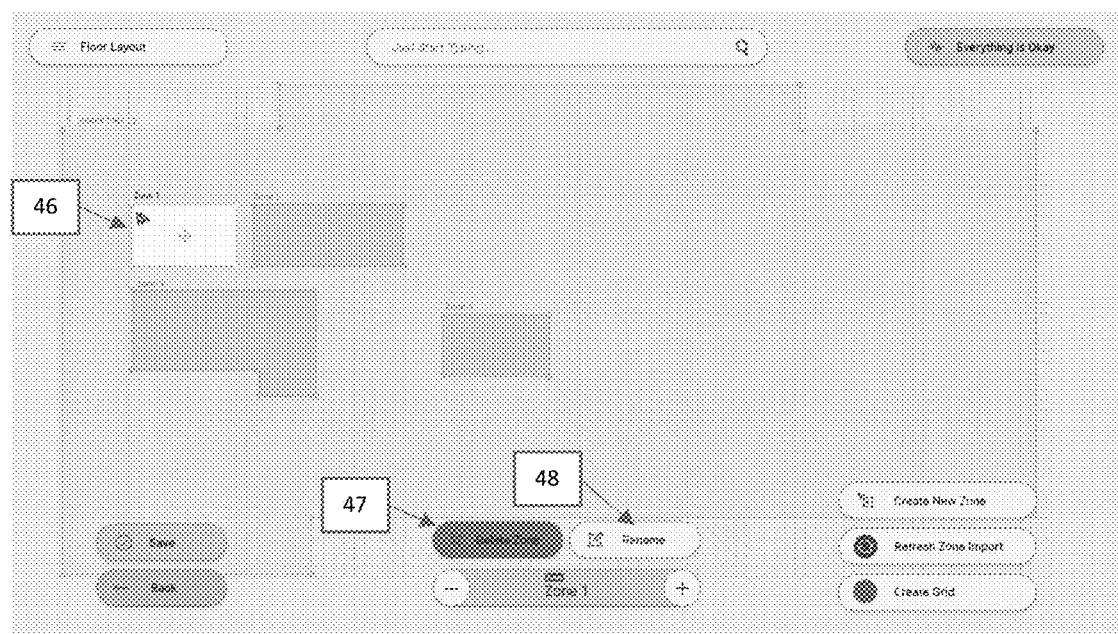
FIG. 12 shows what happens when selecting a Zone in the Zone Editor.

When users click the Rename button in the Zone Editor (FIG. 12) they will be able to type in a new name for the Zone (49) and save it by clicking the Save Name button (50). Users can create a new Zone by clicking the Create New Zone button (51).

Figure 16:
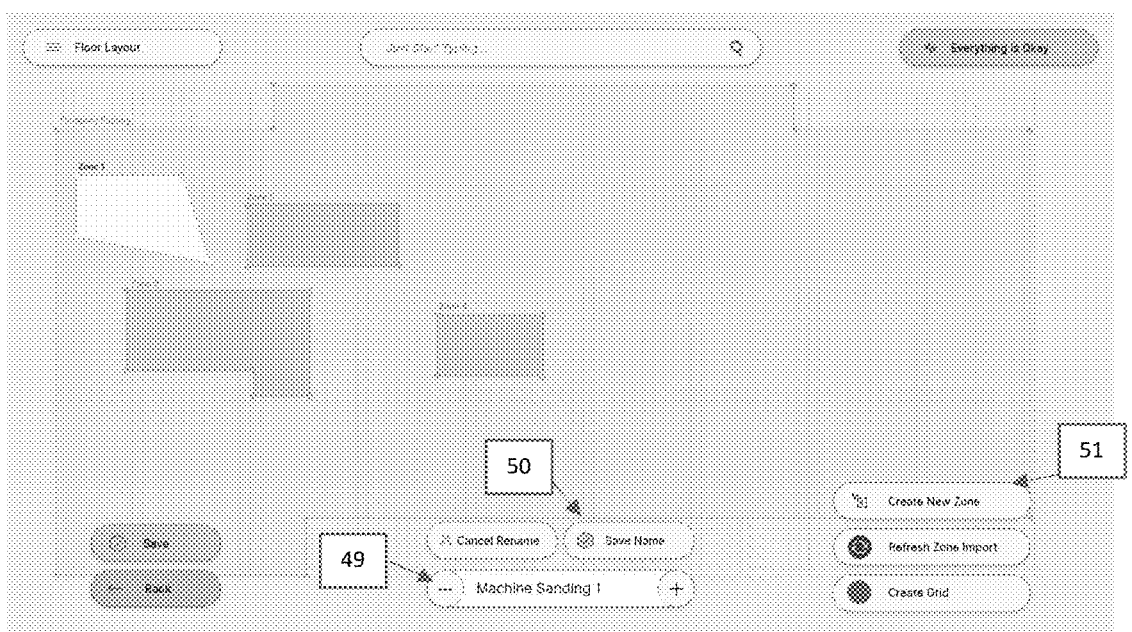
FIG. 16 shows the GUI to rename a Zone in the Zone Editor.
Figure 17:
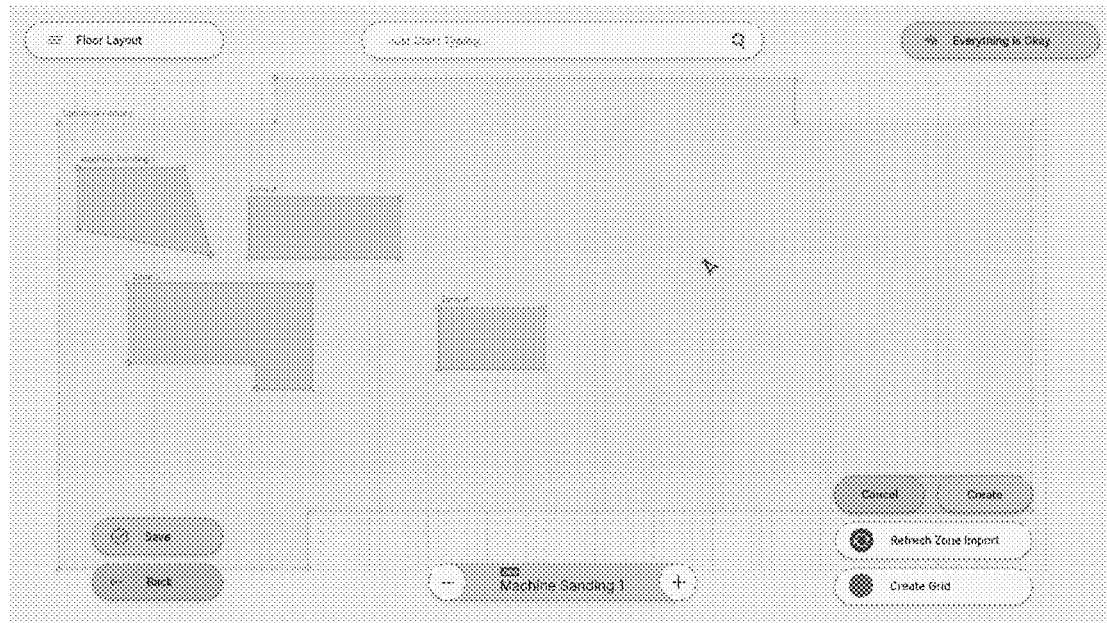
FIG. 17 shows the GUI for creating the first Zone vertex in Zone Editor.
Figure 18:
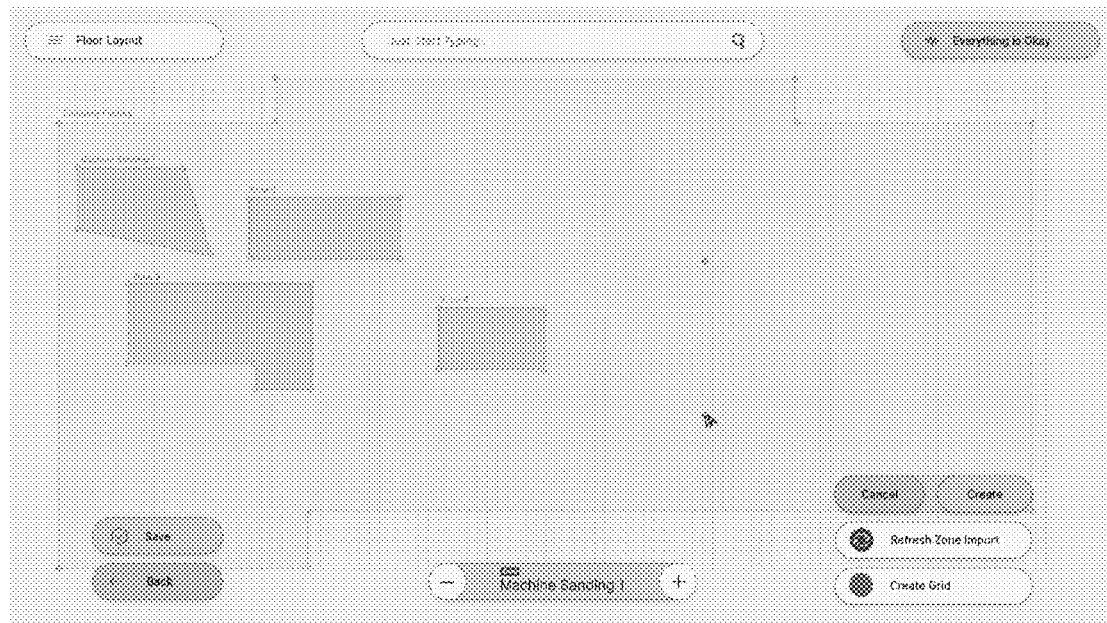
FIG. 18 shows the GUI for creating the second Zone vertex in Zone Editor.
Figure 19:
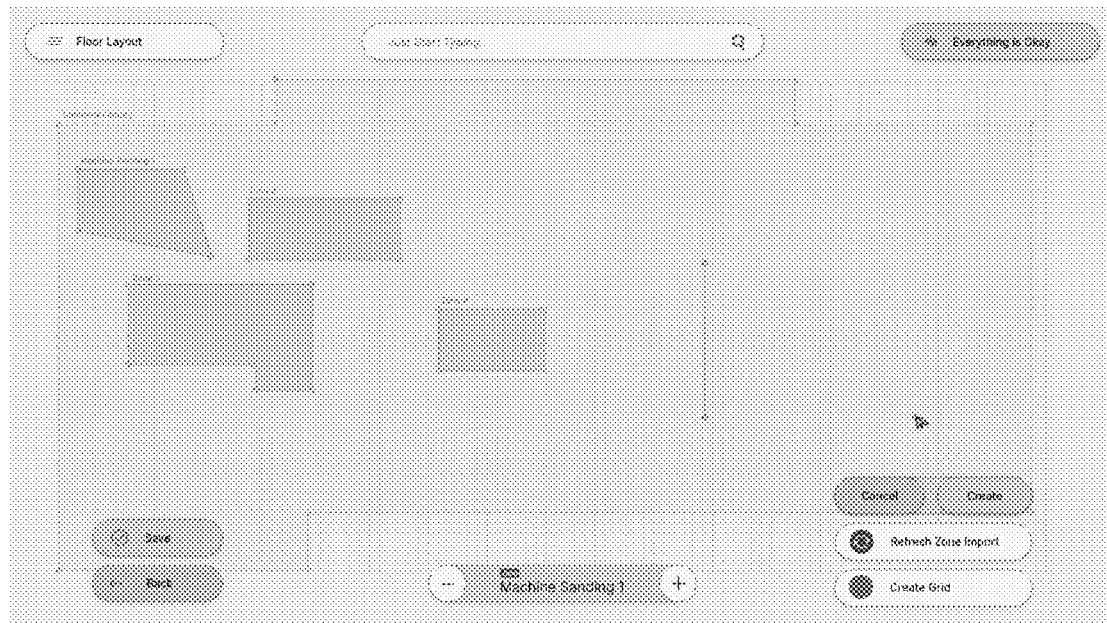
FIG. 19 shows the GUI for creating the third Zone vertex in Zone Editor.
Figure 20:
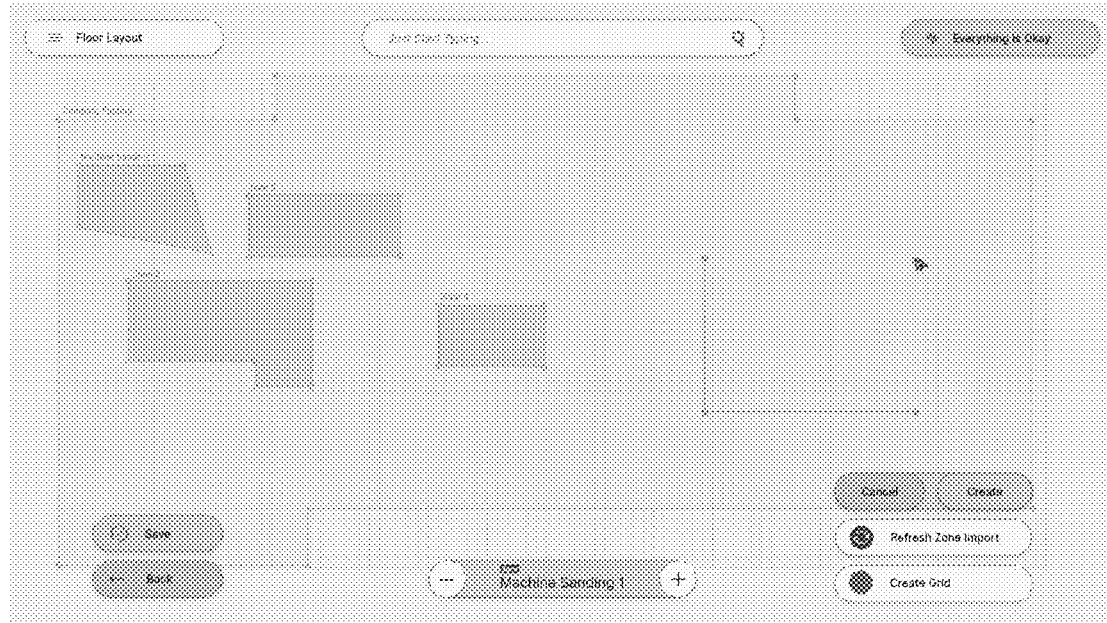
FIG. 20 shows the GUI for creating the fourth Zone vertex in Zone Editor.
Figure 21:
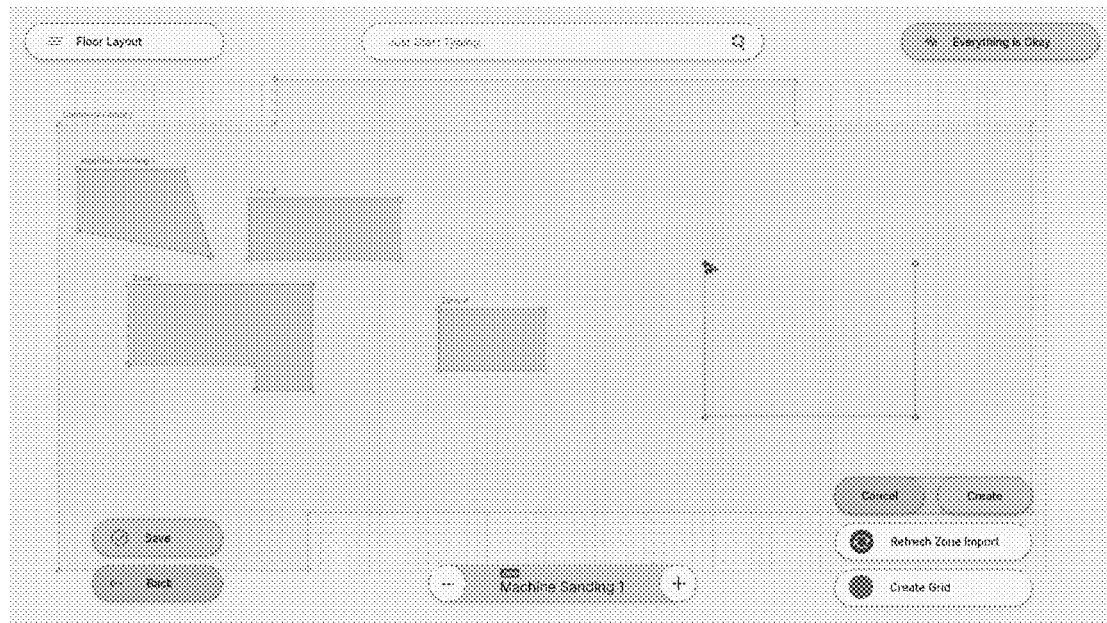
FIG. 21 shows the GUI for linking back the fourth Zone vertex to the first Zone vertex in Zone Editor.
Figure 22:
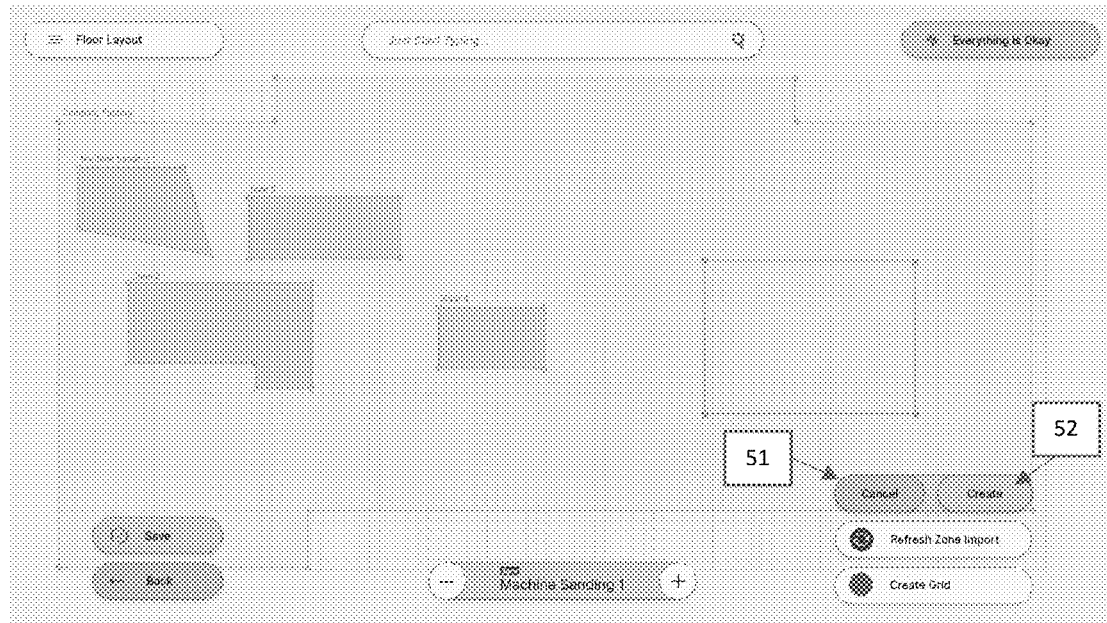
FIG. 22 shows the final shape of the new Zone in Zone Editor.
Figure 23:
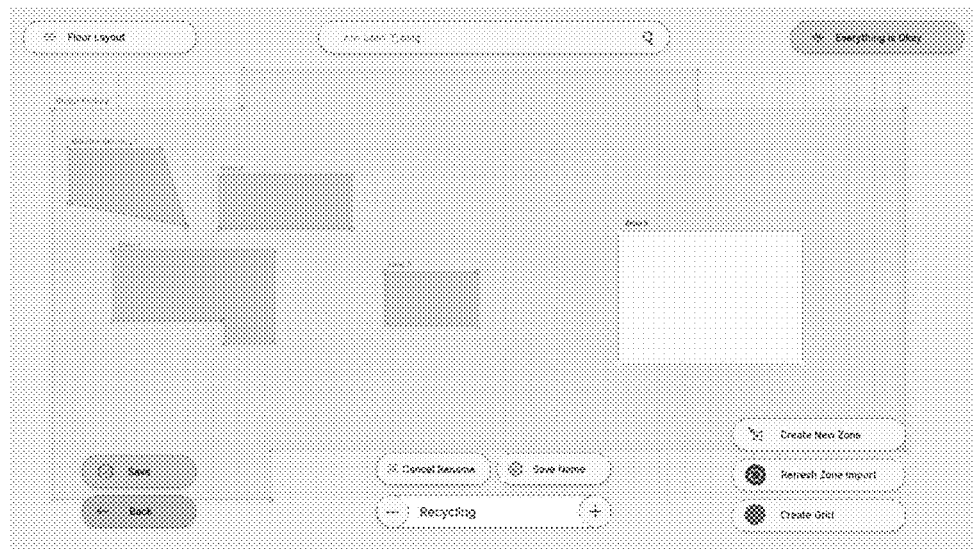
FIG. 23 shows the GUI for naming a new Zone in Zone Editor.
Figure 24:
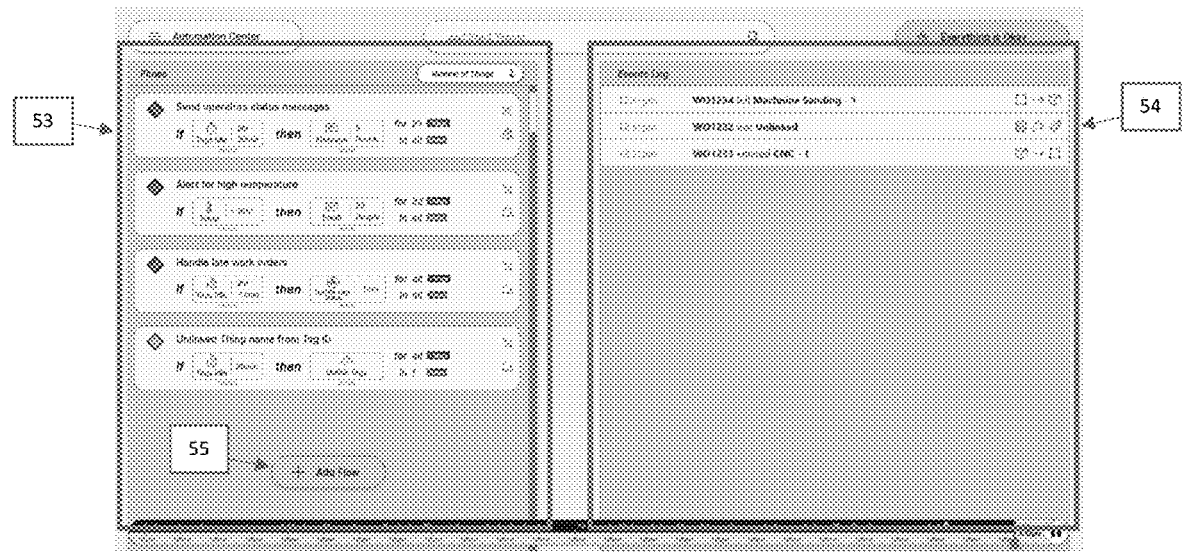
FIG. 24 shows the Automation Center screen.

After clicking the Create New Zone button (FIG. 16) users can create a Zone by placing as many vertecies as they want (FIG. 17-22). Once done (FIG. 22) users can create the Zone by clicking on the Create button (52) or cancel to get out of Zone creation mode (53). After users click Create (52) they can name the Zone (FIG. 23).

When users go into the Automation Center they are shown a list Flows (53) and an Events Log (54). The list of Flows shows the Flow effect (which is the positive or negative connotation a Flow would have once triggered), a name for the Flow, the trigger and resulting action of the Flow, the scope of the Flow in terms of number of Tags and Zones encompassed by the Flow. Users can add a Flow by clicking the Add Flow button (55).

Once users click the Add Flow button, the New Flow Panel slides out (55). Users can select a Trigger for the flow from a predefined set of Triggers (56). Triggers are the criteria that needs to be met before an Action is triggered. Users can similarly pick from a predefined list of Actions (57).

Figure 25:
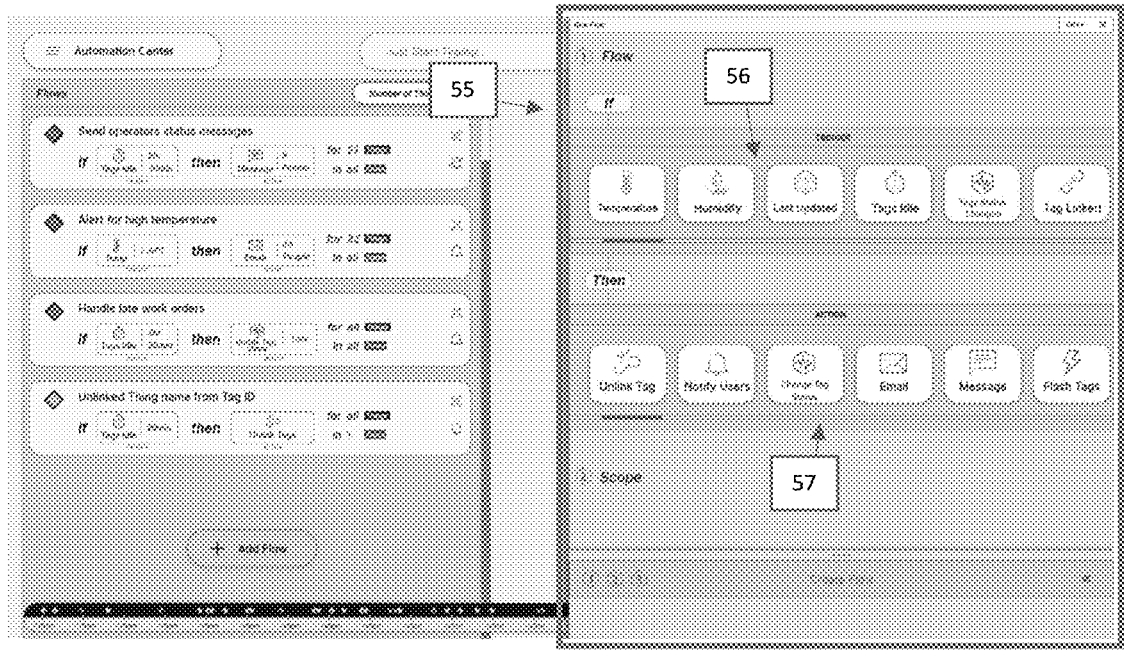
FIG. 25 shows the New Flow Panel in the Automation Center screen.
Figure 26:
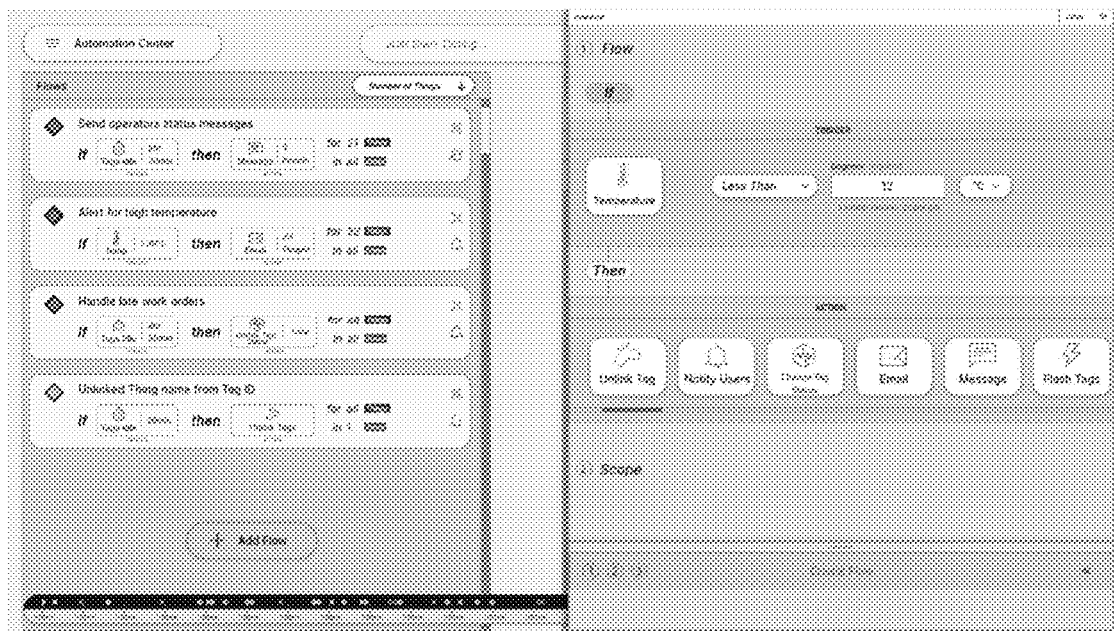
FIG. 26 shows the GUI for setting a Trigger in the New Flow Panel.

When users select a Trigger (FIG. 25) they are required to provide values to set up the desired criteria used to evaluate when a Flow is triggered, in this example (FIG. 26) Temperature is the selected Trigger.

Figure 27:
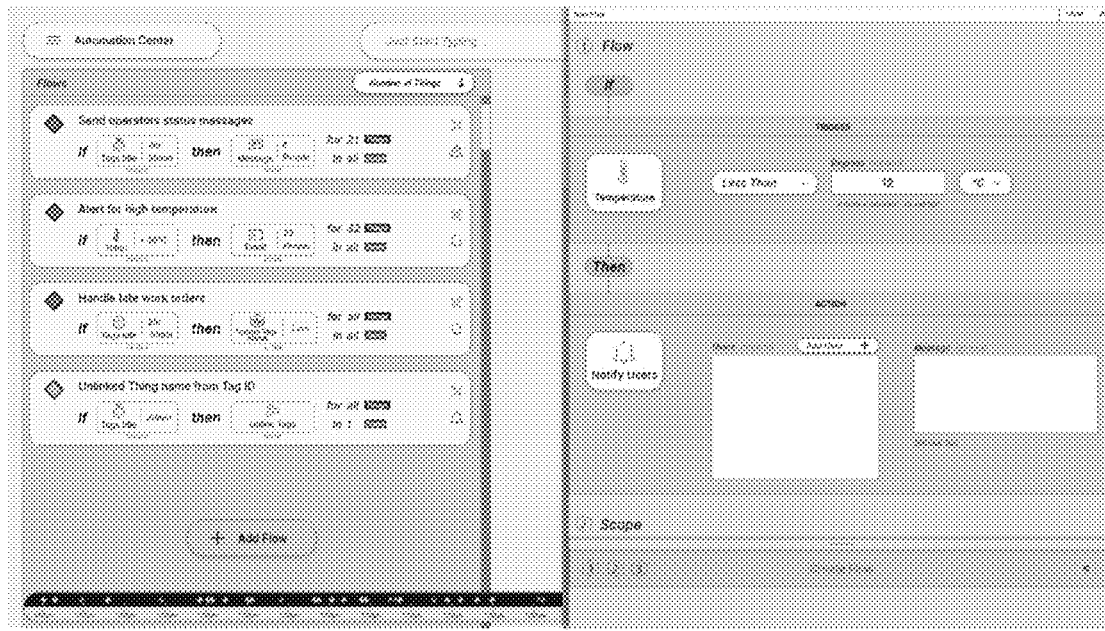
FIG. 27 shows the GUI for setting an Action in the New Flow Panel.
Figure 28:
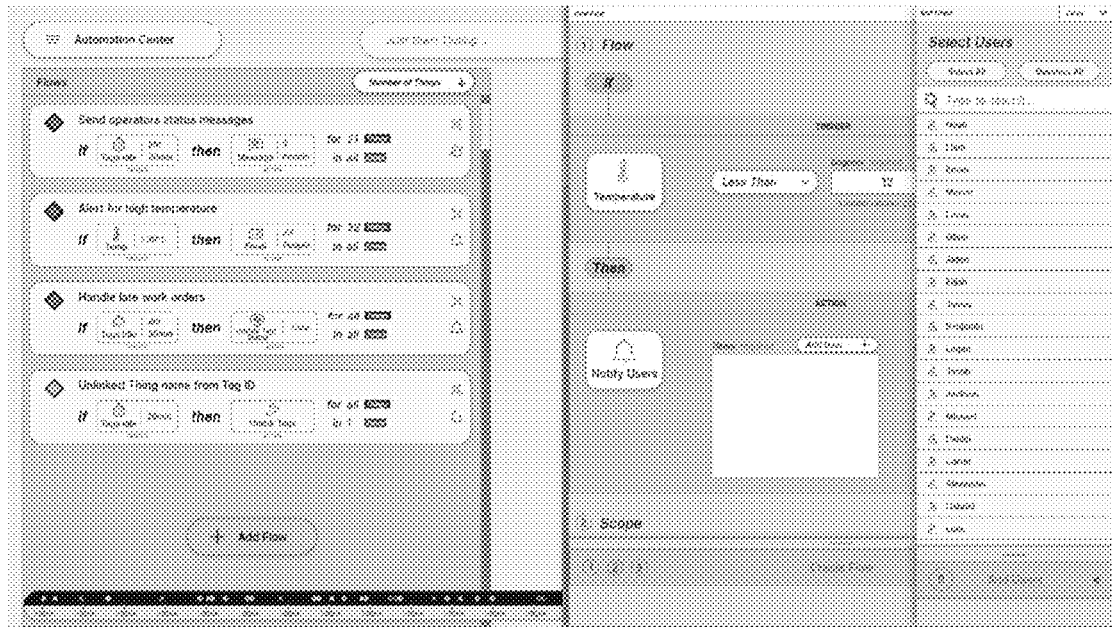
FIG. 28 shows the Add Users Panel.
Figure 29:
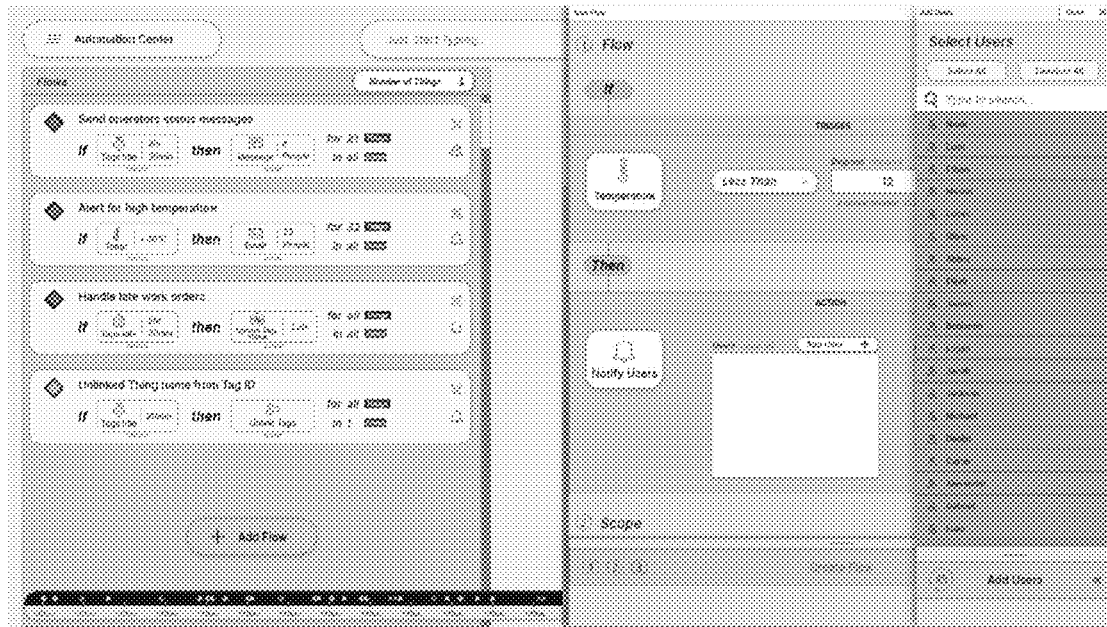
FIG. 29 shows selecting users in the Add Users Panel.
Figure 30:
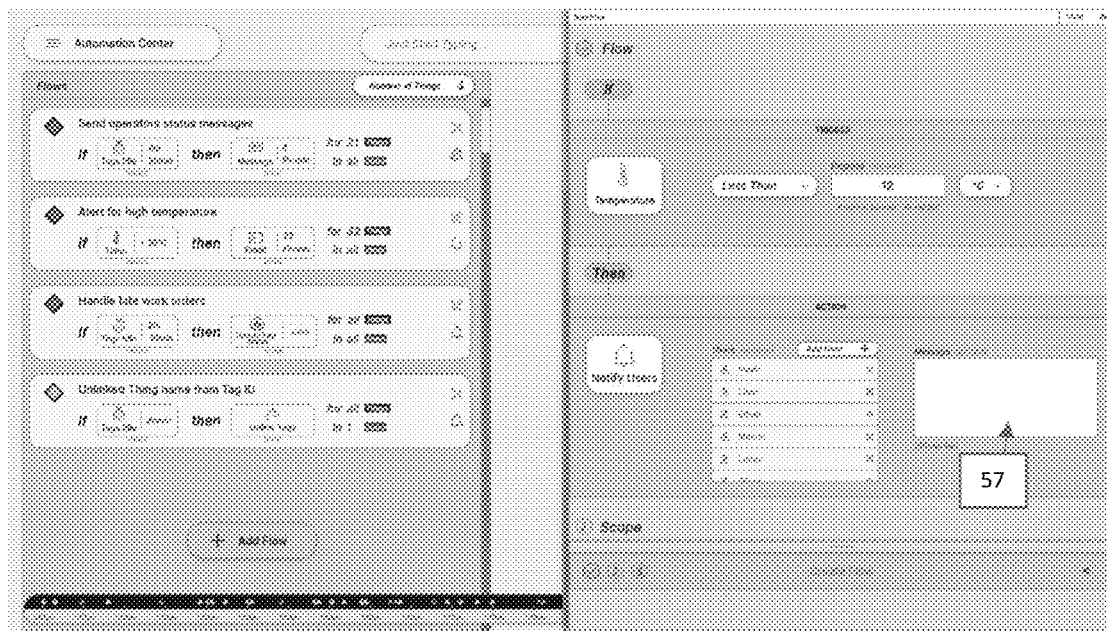
FIG. 30 shows the Notify Users Action in the New Flow Panel filled with users.

When users pick an Action for their Flow (FIG. 25) they can sometimes decide that the Action applies to a set of users (FIG. 27), for example the Notify Users Action requires users add a set of users using the Add Users Panel (FIG. 28, FIG. 29) to be notified of a specific message (57).

Figure 31:
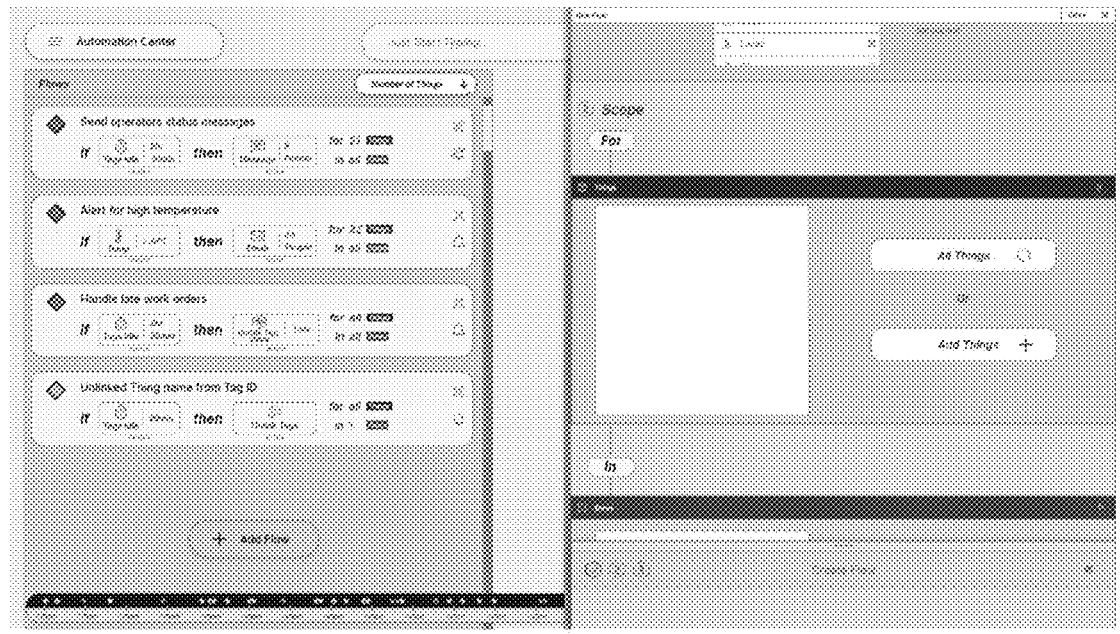
FIG. 31 shows the GUI for setting the scope in the New Flow Panel.

Scrolling down the New Flow Panel, once done setting the Trigger and Action, users will need to set the scope of the Flow (FIG. 31), meaning the specific Things and Zones in which the Flow will apply. This adds another criterion to the Flow by specifying what Things and in what Zones the trigger may apply.

Figure 32:
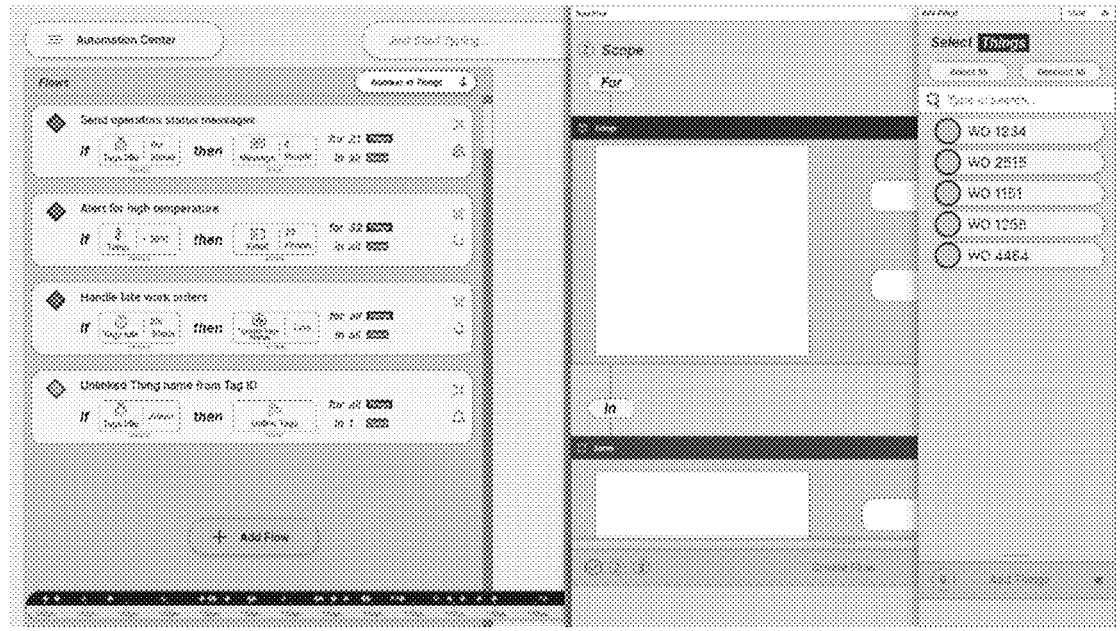
FIG. 32 shows the Add Things Panel.
Figure 33:
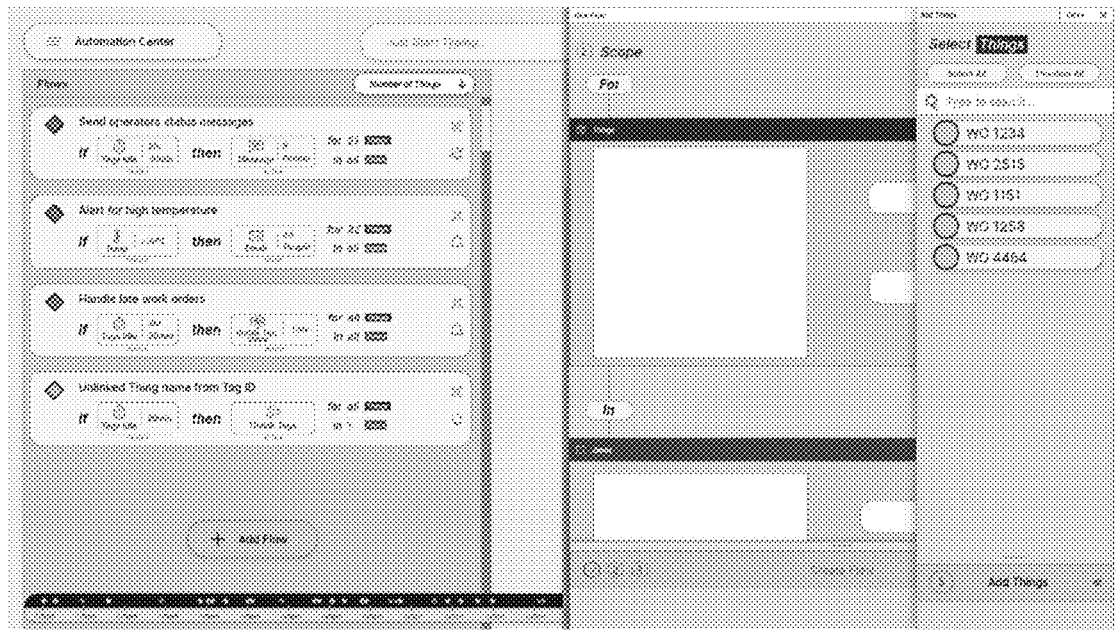
FIG. 33 shows selecting Things in the Add Things Panel.
Figure 34:
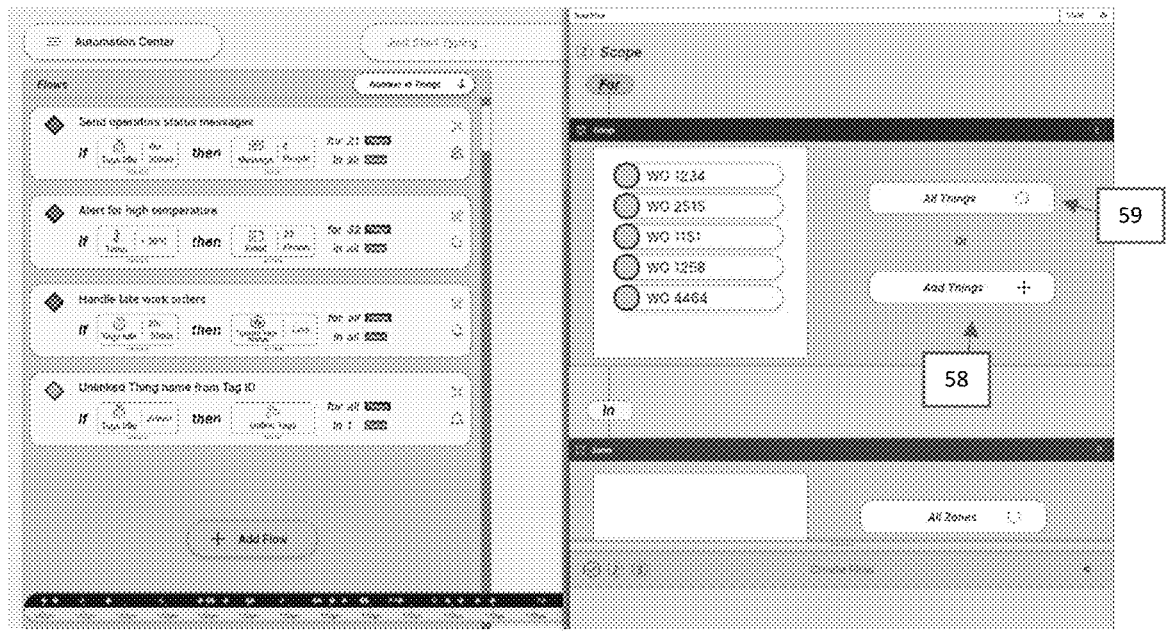
FIG. 34 shows the Things scope with added Things in the New Flow Panel.
Figure 35:
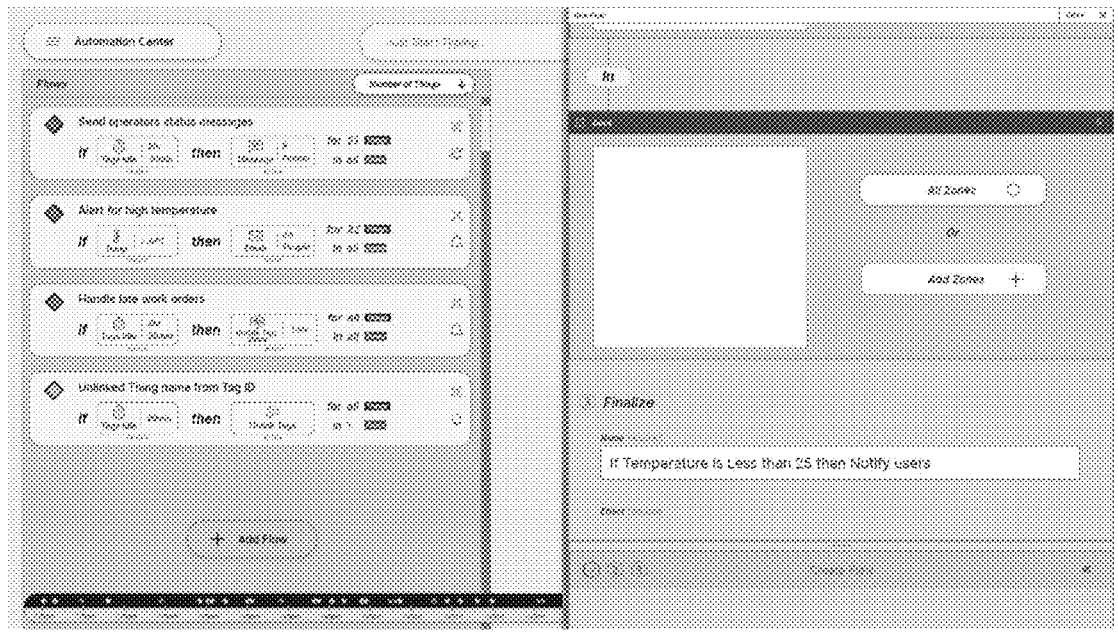
FIG. 35 shows the GUI when scrolling down New Flow Panel to Zones Scope.

Users can add Things to the Things scope using the Add Things Panel (FIG. 32, FIG. 33) by clicking the Add Things button (58) or by simply adding all Things by clicking the All Things button (59).

Figure 36:
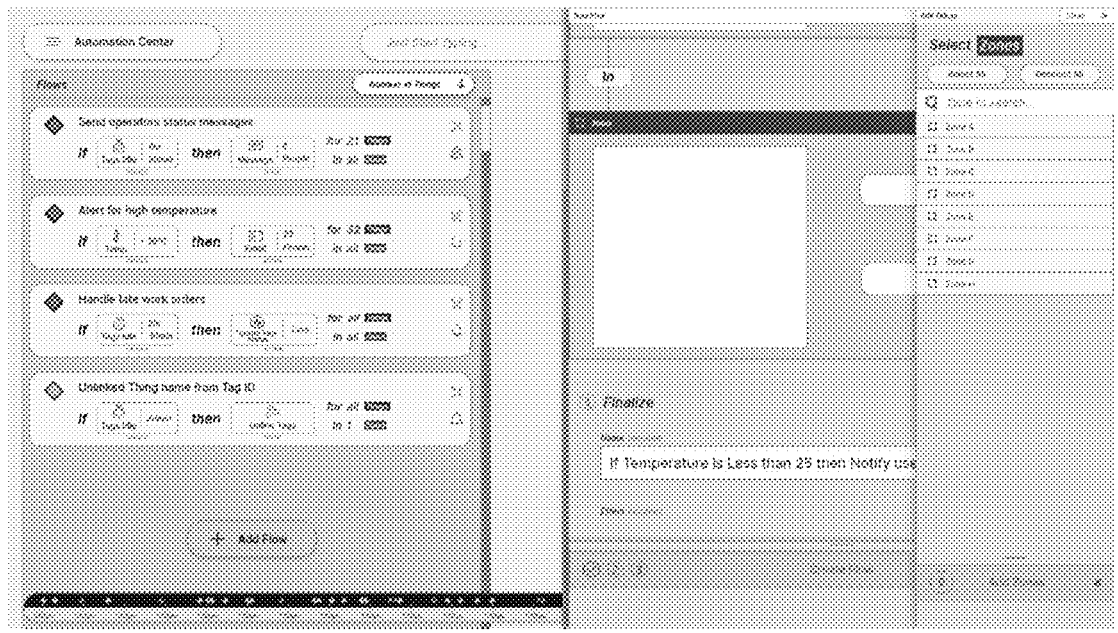
FIG. 36 shows the Add Zone Panel.
Figure 37:
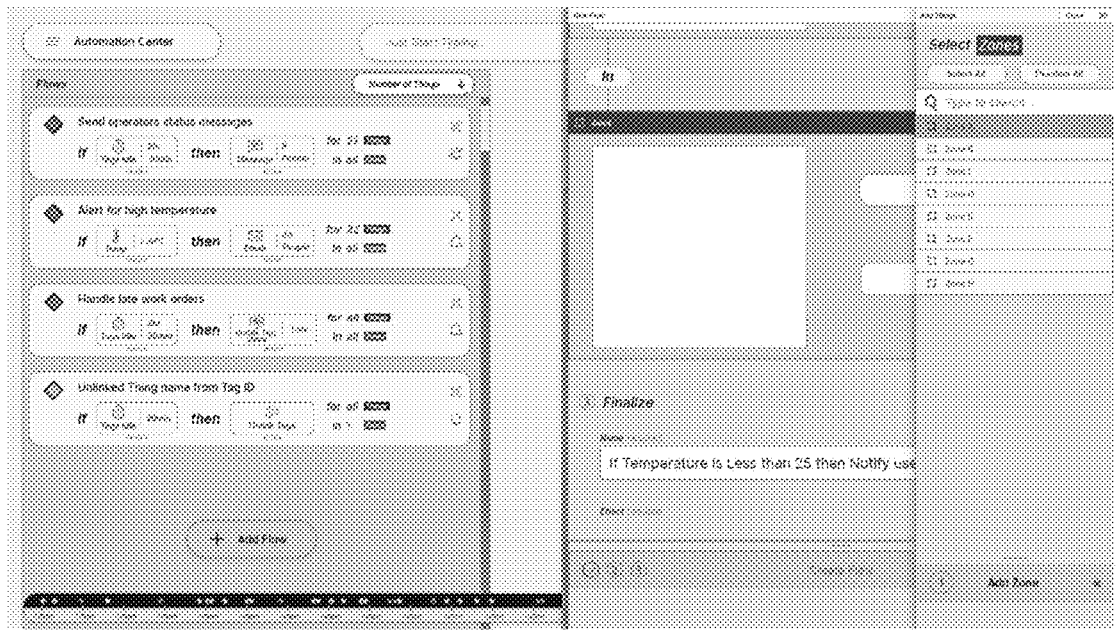
FIG. 37 shows selecting Zones in Add Zone Panel.
Figure 38:
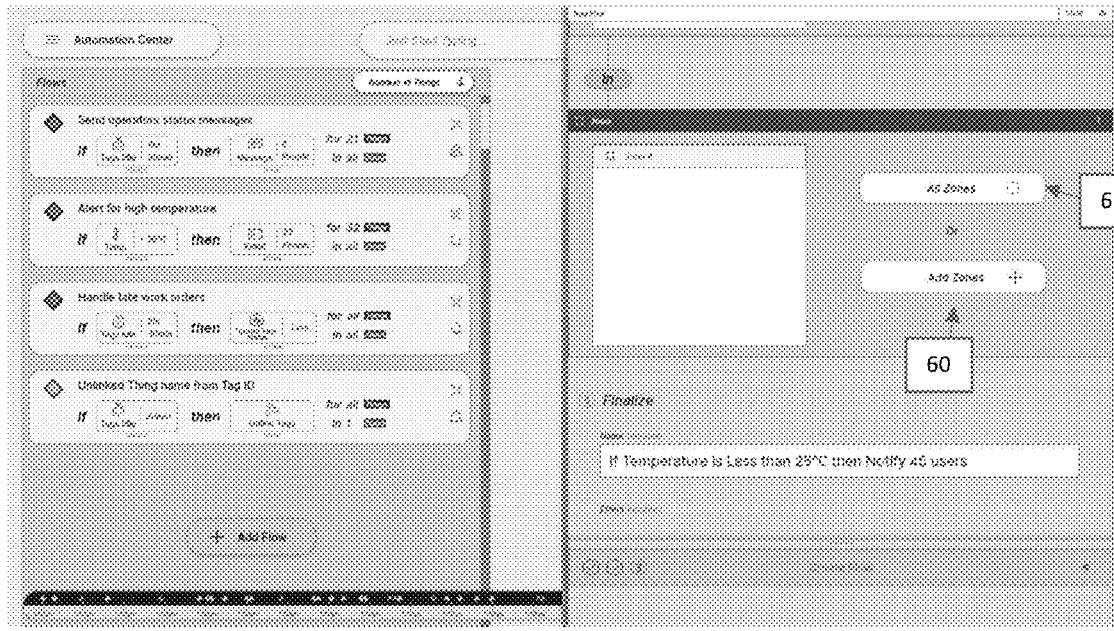
FIG. 38 shows the Zone Scope with added Zone in the New Flow Panel.
Figure 39:
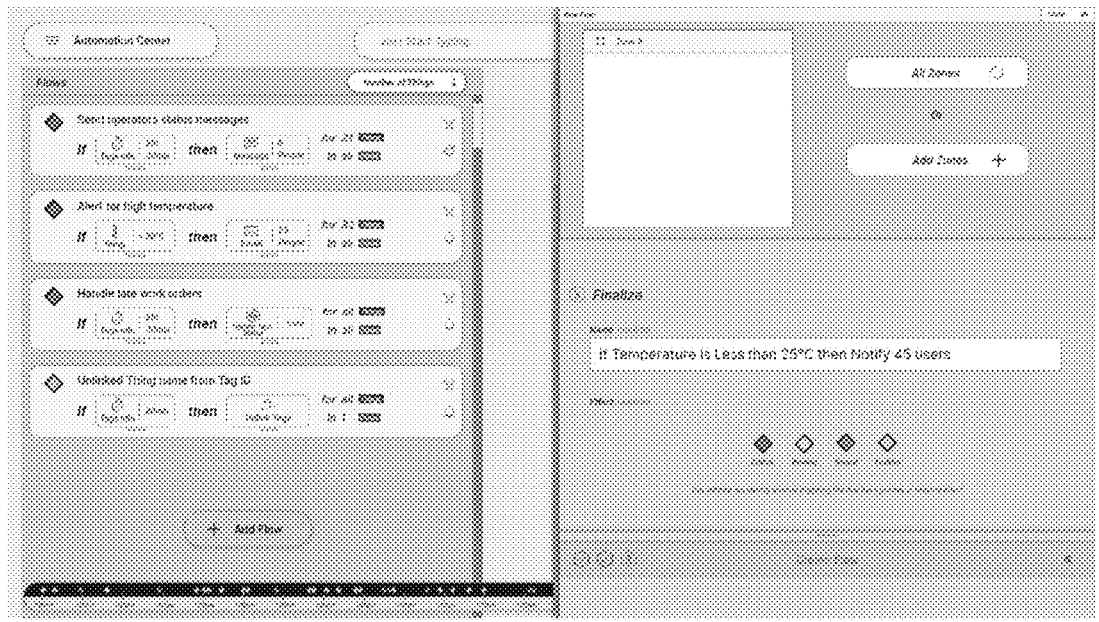
FIG. 39 shows the GUI when scrolling down the New Flow Panel to the Finalize section.
Figure 40:
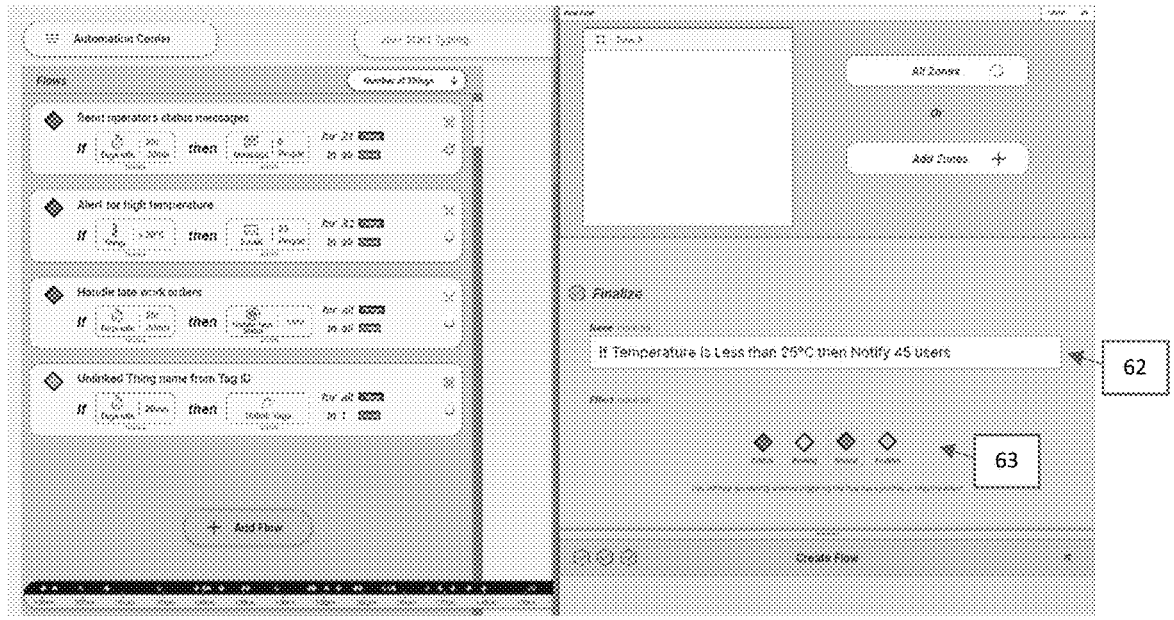
FIG. 40 shows the GUI when selecting an effect in the New Flow Panel.
Figure 41:
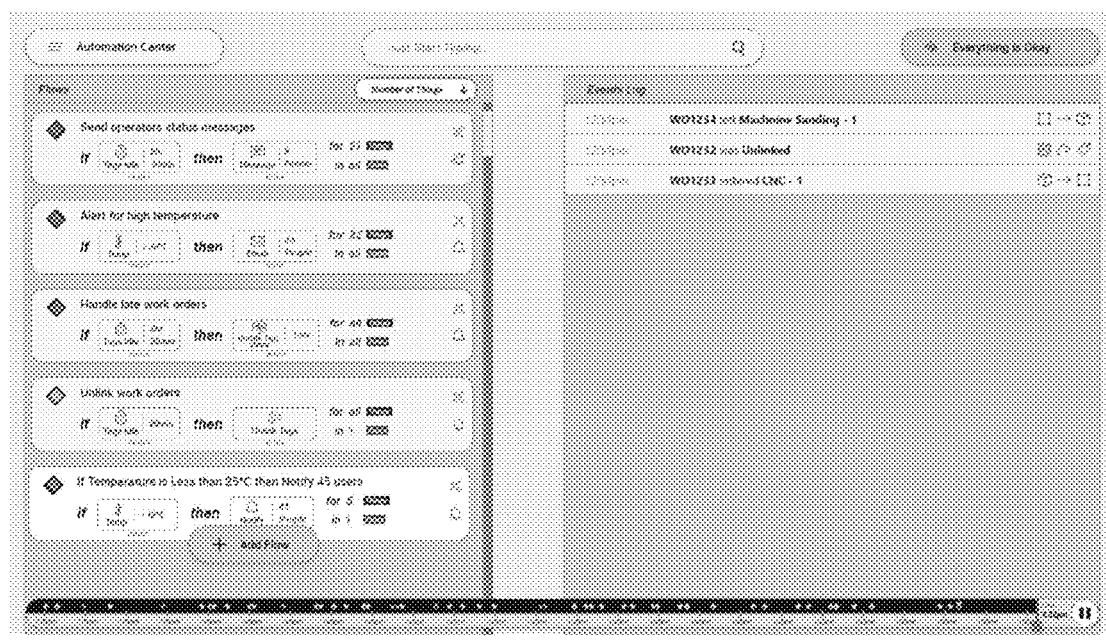
FIG. 41 shows the new Flow added to Flow list.

Like setting the scope of Things, users can set the scope of Zones by adding Zones from the Add Zones Panel (FIG. 36, FIG. 37). Users can pick specific Zones to add via the Add Zones button (60) or add all Zones via the All Zones button (61).

Once users have set the scope, they will need to scroll down to finalize the Flow by giving it a Name to describe it (62), and select an effect to visually see the positive or negative effect the Flow has if triggered (63).

What is claimed is:

1. A system for use with:
   an area;
   a plurality of tags, each tag being movable in and around the area, having at least one sensor and being adapted to wirelessly broadcast an identifier and, for each of said at least one sensor, a reading;
   receiver apparatus for identifying, via analysis of the wireless broadcasts of the tags, for each of the plurality of tags in the area, a specific location for said each tag and for receiving the identifiers and readings; and
   a plurality of zones defined within the area, the system comprising:
   a plurality of user-defined workflows, each user-defined workflow having one or more one trigger conditions, each trigger condition being associated with at least one of a zone and a tag and being a function of one or more of a plurality of predetermined trigger criteria; and
   one or more associated actions selected from a plurality of predetermined actions, and
   control apparatus adapted to:
   receive the identifiers and readings from the receiver apparatus;
   determine based upon the identifiers and readings if any of the one or more trigger conditions of any of the workflows has been met, and
   automatically take the one or more actions associated with each workflow having the one or more trigger conditions thereof determined to have been met,
   wherein the control apparatus comprises a computing functionality adapted to display a representation of the area, the zones and the tags in the area,
   wherein the computing functionality is configured for user definition of the zones by the creation of a boundary on the display with one or more of a mouse, importing, stylus or touchscreen.

2. The system according to claim 1, wherein the computing functionality is configured for user definition of the zones.

3. The system according to claim 2, wherein the computing functionality is configured for user definition of the zones by the modification of a boundary on the display with one or more of a mouse, stylus or touchscreen.

4. The system according to claim 2, wherein the computing functionality is configured for user definition of the workflows.

5. The system according to claim 2, wherein the computing functionality is configured for user definition of zone-specific workflows.

6. The system according to claim 2, wherein the computing functionality is configured to store data for a user to view the location of a tag over time.

7. The system according to claim 2, wherein the computing functionality is configured for user definition of workflows wherein the action is one or more of a notification, an alert, an email, a change in display color and a tag status change.

8. The system according to claim 7, wherein the computing functionality is adapted for association by a user of a work order to a tag.

9. The system according to claim 8, wherein the computing functionality is adapted such that selection of the representation of a tag on the display produces a display of one or more of:
   any work order associated with the tag,
   tag status,
   the time of receipt of the last transmission from the tag,
   a snail track image of the tag through the area,
   graphic representations of sensor readings received from the tag, and
   an area which reflects the margin of error in tag location.

10. The system according to claim 2, wherein the at least one sensor includes a temperature sensor and at least one of the trigger conditions is a temperature limit.

11. The system according to claim 2, wherein the computing functionality is configured for user definition of workflows wherein each workflow has an associated indicia.

12. The system according to claim 11, wherein the computing functionality is adapted to display the actions taken in the area over a period of time through a display of the indicia associated with the workflows performed over the period of time.

13. The system according to claim 2, wherein the at least one sensor includes a motion sensor and at least one of the trigger conditions is associated with motion.

14. The system according to claim 2, wherein at least one of the trigger conditions is failure of a tag to broadcast when expected.

15. The system according to claim 2, wherein at least one of the trigger conditions is associated with an unexpected tag broadcast.

16. The system according to claim 1, wherein the computing functionality is configured for user definition of overlapping zones.

17. The system according to claim 1, wherein 1 the computing functionality is configured for user import of the zones.

18. The system according to claim 1, wherein the at least one sensor includes a humidity sensor and at least one of the trigger conditions is humidity.

* * * * *